US012679501B2

(12) United States Patent
Sakai

(10) Patent No.: US 12,679,501 B2
(45) Date of Patent: Jul. 14, 2026

(54) COMPONENT FOR HUMAN-POWERED VEHICLE

(71) Applicant: Shimano Inc., Sakai (JP)

(72) Inventor: Masanori Sakai, Sakai (JP)

(73) Assignee: Shimano Inc., Osaka (JP)

(*) Notice: Subject to any disclaimer, the term of this patent is extended or adjusted under 35 U.S.C. 154(b) by 74 days.

(21) Appl. No.: 18/769,935

(22) Filed: Jul. 11, 2024

(65) Prior Publication Data

US 2025/0136241 A1 May 1, 2025

(30) Foreign Application Priority Data

Oct. 31, 2023 (JP) ................................ 2023-187129

(51) Int. Cl.

*B62M 6/55* (2010.01)
*B62M 11/14* (2006.01)
*B62M 11/18* (2006.01)
*F16H 3/62* (2006.01)
*F16H 3/66* (2006.01)

(52) U.S. Cl.

CPC ............ *B62M 6/55* (2013.01); *B62M 11/145* (2013.01); *B62M 11/18* (2013.01); *F16H 3/62* (2013.01); *F16H 3/666* (2013.01)

(58) Field of Classification Search

CPC ...... B62M 6/55; B62M 11/145; B62M 11/18; B62M 11/14; F16H 3/62; F16H 3/666

See application file for complete search history.

(56) References Cited

U.S. PATENT DOCUMENTS

| | | | | |
|---|---|---|---|---|
| 6,048,287 A * | 4/2000 | Rohloff | B62M 11/18 475/289 |
| 9,017,201 B2 * | 4/2015 | Hino | B62M 6/40 475/5 |
| 2016/0052595 A1 | 2/2016 | Dommsch | |
| 2016/0288872 A1 * | 10/2016 | Shahana | B62K 25/286 |
| 2017/0029068 A1 * | 2/2017 | Hayslett | B62M 6/55 |
| 2017/0137085 A1 * | 5/2017 | Yamamoto | F16H 3/666 |
| 2024/0239442 A1 * | 7/2024 | Van Druten | F16H 37/042 |

FOREIGN PATENT DOCUMENTS

| | | | | |
|---|---|---|---|---|
| DE | 10 2018 217 097 A1 | 4/2020 | |
| JP | 4117825 B2 | 5/2008 | |
| JP | 5649549 B2 | 11/2014 | |
| JP | 2018-100060 A | 6/2018 | |
| WO | 2017/052141 A1 | 3/2017 | |
| WO | 2021/125972 A1 | 6/2021 | |
| WO | WO-2022248135 A1 * | 12/2022 | F16H 37/042 |

* cited by examiner

*Primary Examiner* — Timothy Hannon
(74) *Attorney, Agent, or Firm* — Spencer Fane, LLP

(57) ABSTRACT

A component for a human-powered vehicle basically includes a transmission device, a shaft member and a speed increaser. The transmission device includes a plurality of transmission stages. The shaft member is spaced from an input rotational shaft of the human-powered vehicle and arranged on the shaft member. The speed increaser is configured to transmit a human driving force that is input to the input rotational shaft to the transmission device. The speed increaser includes at least one first planetary gear group. The at least one first planetary gear group is rotatable about a rotational center axis of the shaft member.

17 Claims, 17 Drawing Sheets

COMPONENT FOR HUMAN-POWERED VEHICLE

CROSS-REFERENCE TO RELATED APPLICATIONS

This application claims priority to Japanese Patent Application No. 2023-187129, filed on Oct. 31, 2023. The entire disclosure of Japanese Patent Application No. 2023-187129 is hereby incorporated herein by reference.

BACKGROUND

Technical Field

The present disclosure generally relates to a component for a human-powered vehicle.

Background Information

Japanese Laid-Open Patent Publication No. 2018-100060 (Patent Document 1) discloses an example of a component including a transmission device.

SUMMARY

One objective of the present disclosure is to provide a component for a human-powered vehicle that transmits human driving force in a preferred manner.

A component in accordance with a first aspect of the present disclosure is for a human-powered vehicle. The component comprises a transmission device, a shaft member and a speed increaser. The transmission device includes a plurality of transmission stages. The shaft member is spaced from an input rotational shaft of the human-powered vehicle. The transmission device is arranged on the shaft member. The speed increaser is configured to transmit a human driving force that is input to the input rotational shaft to the transmission device. The speed increaser includes at least one first planetary gear group. The at least one first planetary gear group is rotatable about a rotational center axis of the shaft member.

In the component according to the first aspect, a human driving force input to the input rotational shaft is transmitted through the speed increaser including the at least one first planetary gear group to the transmission device arranged on the shaft member. The speed increaser decreases torque that is input to the transmission device, thereby decreasing loads on the transmission device. Thus, the human driving force is transmitted in a preferred manner. In the component according to the first aspect, the at least one first planetary gear group is rotatable about the rotational center axis of the shaft member, which is distanced from the input rotational shaft. This allows for a decrease in the size of the component in the axial direction of the input rotational shaft.

A component in accordance with a second aspect of the present disclosure is for a human-powered vehicle. The component comprises a transmission device, a shaft member and a speed increaser. The transmission device includes a plurality of transmission stages. The shaft member is spaced from an input rotational shaft of the human-powered vehicle. The transmission device is arranged on the shaft member. The speed increaser is configured to transmit a human driving force that is input to the input rotational shaft to the transmission device. The speed increaser includes at least one first planetary gear group. The transmission device includes at least one second planetary gear group.

With the component according to the second aspect, a human driving force input to the input rotational shaft is transmitted through the speed increaser including the at least one first planetary gear group to the transmission device arranged on the shaft member and including the at least one second planetary gear group. Thus, the component transmits the human driving force in a preferred manner.

In accordance with a third aspect of the present disclosure, the component according to the second aspect is configured so that the at least one first planetary gear group is rotatable about a rotational center axis of the shaft member.

With the component according to the third aspect, the at least one first planetary gear group is arranged in a preferred manner.

In accordance with a fourth aspect of the present disclosure, the component according to the first or third aspect is configured so that the speed increaser further includes a speed-increasing unit that differs from the at least one first planetary gear group. The speed-increasing unit is configured to transmit the human driving force that is input to the input rotational shaft to the at least one first planetary gear group.

With the component according to the fourth aspect, the speed-increasing unit further decreases torque that is input to the transmission device, thereby further decreasing loads on the transmission device.

In accordance with a fifth aspect of the present disclosure, the component according to the fourth aspect is configured so that the speed-increasing unit includes a first speed-increasing gear arranged coaxially with the input rotational shaft, and a second speed-increasing gear meshed with the first speed-increasing gear and arranged coaxially with the shaft member.

With the component according to the fifth aspect, the speed-increasing unit transmits the human driving force to the at least one first planetary gear group with a simple structure that uses the first speed-increasing gear and the second speed-increasing gear.

In accordance with a sixth aspect of the present disclosure, the component according to the fifth aspect is configured so that the at least one first planetary gear group includes a speed-increasing input portion and a speed-increasing output portion. The speed-increasing input portion and the speed-increasing output portion are configured to rotate in opposite directions.

In the component according to the sixth aspect, with the speed increaser, rotational force that is input to the speed-increasing input portion is output from the speed-increasing output portion in a direction opposite to the direction of the rotational force input to the speed-increasing input portion.

In accordance with a seventh aspect of the present disclosure, the component according to the sixth aspect is configured so that the speed-increasing input portion is formed integrally with the second speed-increasing gear.

In the component according to the seventh aspect, with the at least one first planetary gear group, rotational force that is input to the second speed-increasing gear is output from the speed-increasing output portion in a direction opposite to the direction of the rotational force input to the second speed-increasing gear.

In accordance with an eighth aspect of the present disclosure, the component according to the sixth or seventh aspect is configured so that the speed-increasing input portion includes a speed-increasing ring gear. The speed-increasing output portion includes a speed-increasing sun gear.

With the component according to the eighth aspect, the speed-increasing ring gear and the speed-increasing sun gear allow the speed increaser to output rotational force, which is input to the speed-increasing input portion, from the speed-increasing output portion in a direction opposite to the direction in which the rotational force is input to the speed-increasing input portion.

In accordance with a ninth aspect of the present disclosure, the component according to any one of the sixth to eighth aspects is configured so that the at least one first planetary gear group is located between the second speed-increasing gear and the transmission device in an axial direction of the shaft member.

With the component according to the ninth aspect, the at least one first planetary gear group is located between the second speed-increasing gear and the transmission device in the axial direction of the shaft member. This allows rotational force to be transmitted from one side to the other side in the axial direction. Thus, the component transmits the human driving force in a further preferred manner.

In accordance with a tenth aspect of the present disclosure, the component according to any one of the sixth to ninth aspects further comprises a motor configured to apply a propulsion force to the human-powered vehicle. The speed-increasing input portion is configured to receive the rotational torque of the motor.

With the component according to the tenth aspect, human driving force and rotational force of the motor are combined in the speed-increasing input portion.

In accordance with an eleventh aspect of the present disclosure, the component according to any one of the first to tenth aspects further comprises the input rotational shaft.

The component according to the eleventh aspect transmits the human driving force that is input from the input rotational shaft in a preferred manner.

In accordance with a twelfth aspect of the present disclosure, the component according to the eleventh aspect is configured so that the shaft member is arranged substantially parallel to the input rotational shaft.

With the component according to the twelfth aspect, the shaft member is arranged substantially parallel to the input rotational shaft. Thus, the human driving force is readily transmitted from the input rotational shaft to the transmission device.

In accordance with a thirteenth aspect of the present disclosure, the component according to the eleventh or twelfth aspect further comprises an output rotor configured to output a driving force that is output from the transmission device. The output rotor is arranged coaxially with the shaft member.

With the component according to the thirteenth aspect, the output rotor is not coaxial with the input rotational shaft. This increases the degree of freedom for arrangement of the output rotor.

In accordance with a fourteenth aspect of the present disclosure, the component according to the thirteenth aspect is configured so that the at least one first planetary gear group, the transmission device, and the output rotor are arranged in an axial direction of the shaft member in an order of the at least one first planetary gear group, the transmission device, and the output rotor.

With the component according to the fourteenth aspect, rotational force transmitted through the speed increaser and the transmission device is output from the output rotor in a preferred manner.

In accordance with a fifteenth aspect of the present disclosure, the component according to the thirteenth or fourteenth aspect is configured so that the speed increaser and the transmission device are configured to rotate the output rotor forward in a case where the input rotational shaft rotates forward.

With the component according to the fifteenth aspect, the speed increaser and the transmission device rotate the input rotational shaft and the output rotor in the same direction. Thus, the component is readily mounted on the human-powered vehicle.

In accordance with a sixteenth aspect of the present disclosure, the component according to the second or third aspect is configured so that the at least one second planetary gear group includes a plurality of transmission ring gears. The transmission device is configured to change a rotational state of the transmission ring gears to switch the transmission stages of the transmission device in steps.

With the component according to the sixteenth aspect, the transmission device changes the rotational state of the transmission ring gears to switch the transmission stage in a preferred manner without complicating the structure of the vicinity of the shaft member.

In accordance with a seventeenth aspect of the present disclosure, the component according to any one of the first to sixteenth aspects is configured so that the input rotational shaft includes a crank axle.

With the component according to the seventeenth aspect, the human driving force input to the crank axle is transmitted in a preferred manner.

In accordance with an eighteenth aspect of the present disclosure, the component according to any one of the first to seventeenth aspects further comprises a housing accommodating the input rotational shaft, the speed increaser, and transmission device, and an output rotational portion to which a driving force output from the transmission device is transmitted. The output rotational portion is configured to transmit the driving force to a rear wheel through a linking member.

With the component according to the eighteenth aspect, the housing protects the speed increaser and the transmission device. In addition, the driving force transmitted to the output rotational portion is transmitted to the rear wheel through the linking member in a preferred manner.

The component for a human-powered vehicle according to the present disclosure transmits human driving force in a preferred manner.

BRIEF DESCRIPTION OF THE DRAWINGS

Referring now to the attached drawings which form a part of this original disclosure, an illustrative embodiment is shown.

DETAILED DESCRIPTION

Figure 1:
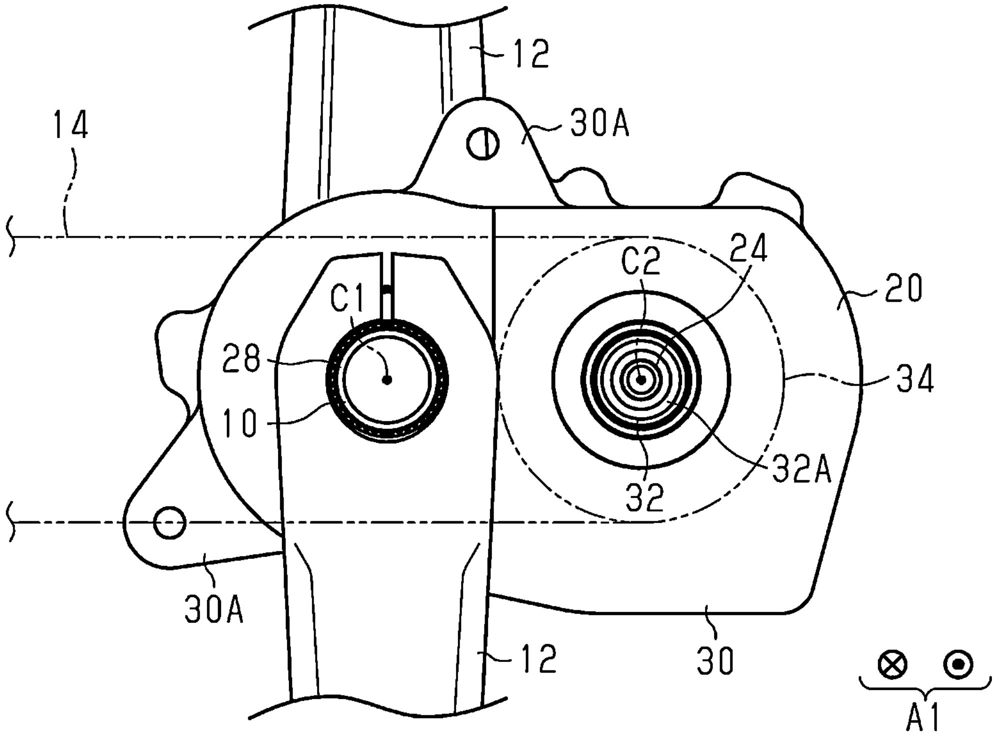
FIG. 1 is a side elevational view of a human-powered vehicle component including a human-powered vehicle transmission device in accordance with a first embodiment.
Figure 2:
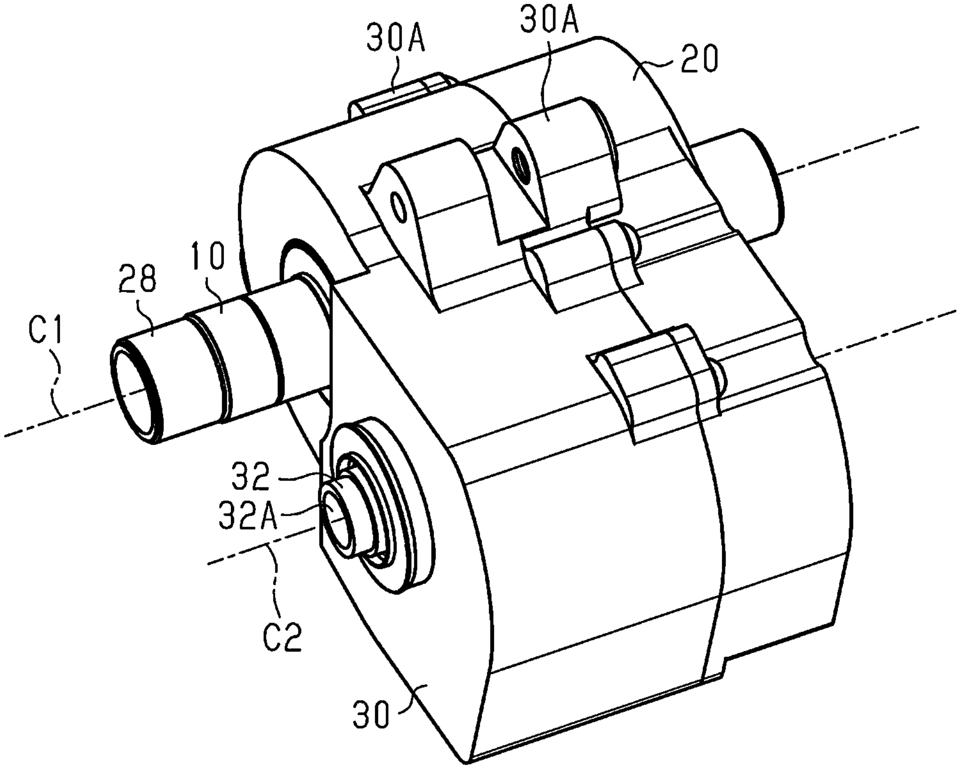
FIG. 2 is a perspective view of the human-powered vehicle component shown in FIG. 1.
Figure 3:
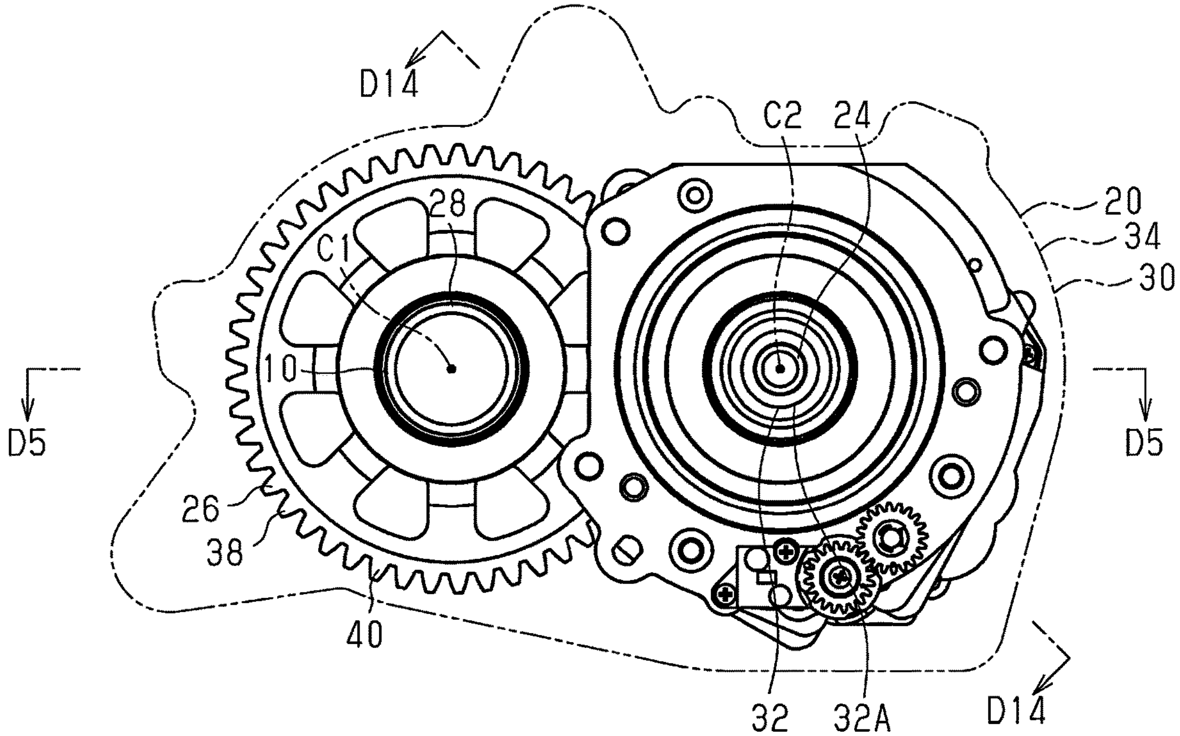
FIG. 3 is a side view of the human-powered vehicle component shown in FIG. 1 without a housing in a first direction.
Figure 4:
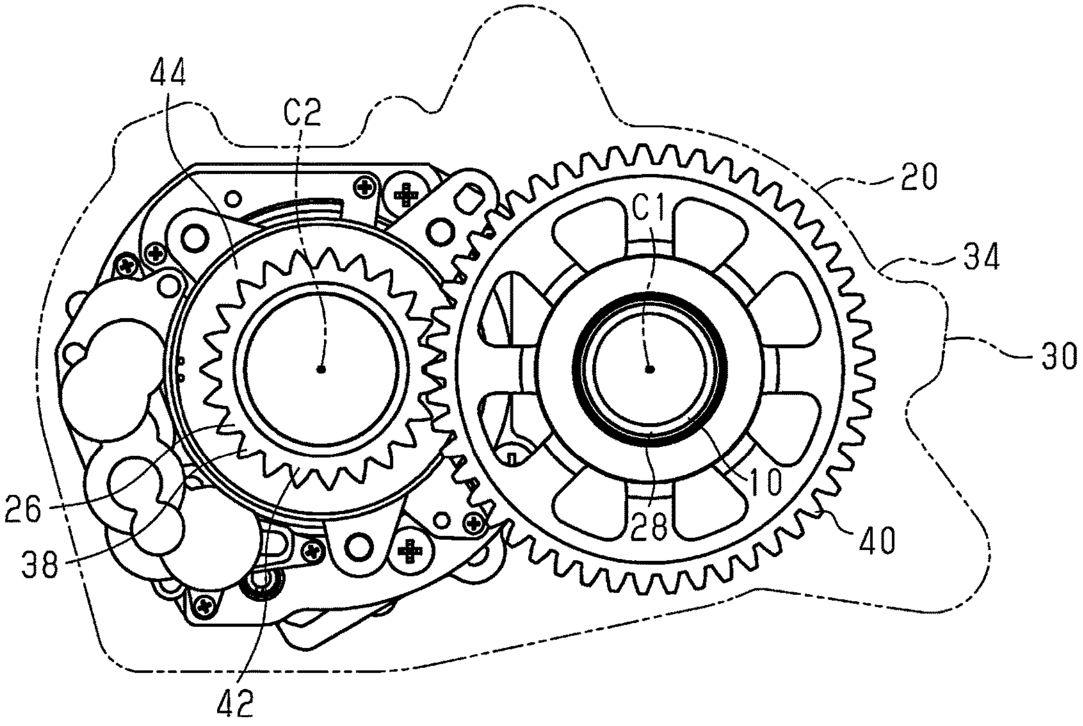
FIG. 4 is a side view of the human-powered vehicle component shown in FIG. 1 without the housing in a second direction.
Figure 5:
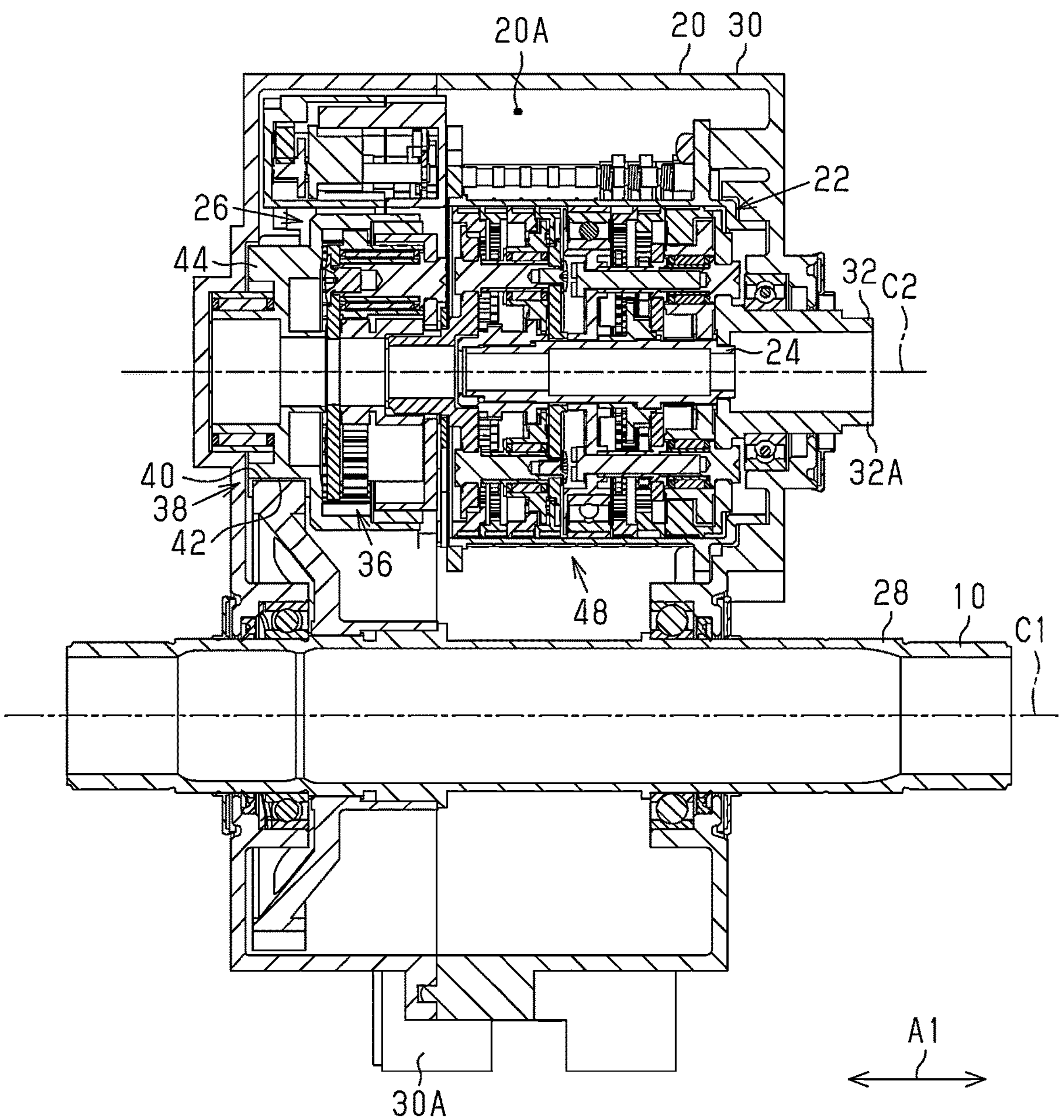
FIG. 5 is a cross-sectional view of the human-powered vehicle component taken along section line D5-D5 in FIG. 3.
Figure 6:
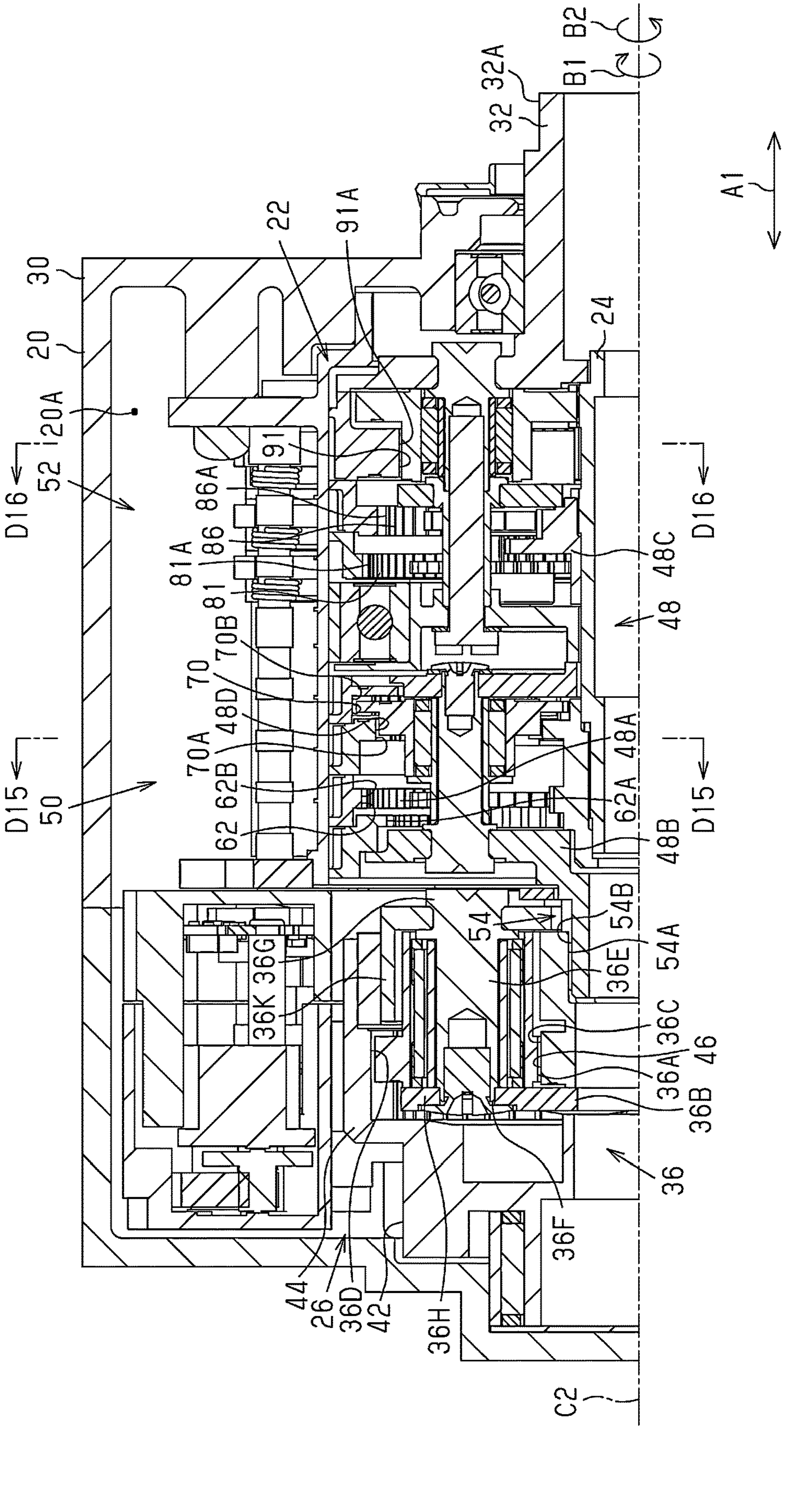
FIG. 6 is an enlarged partial cross-sectional view of the human-powered vehicle component shown in FIG. 5.
Figure 7:
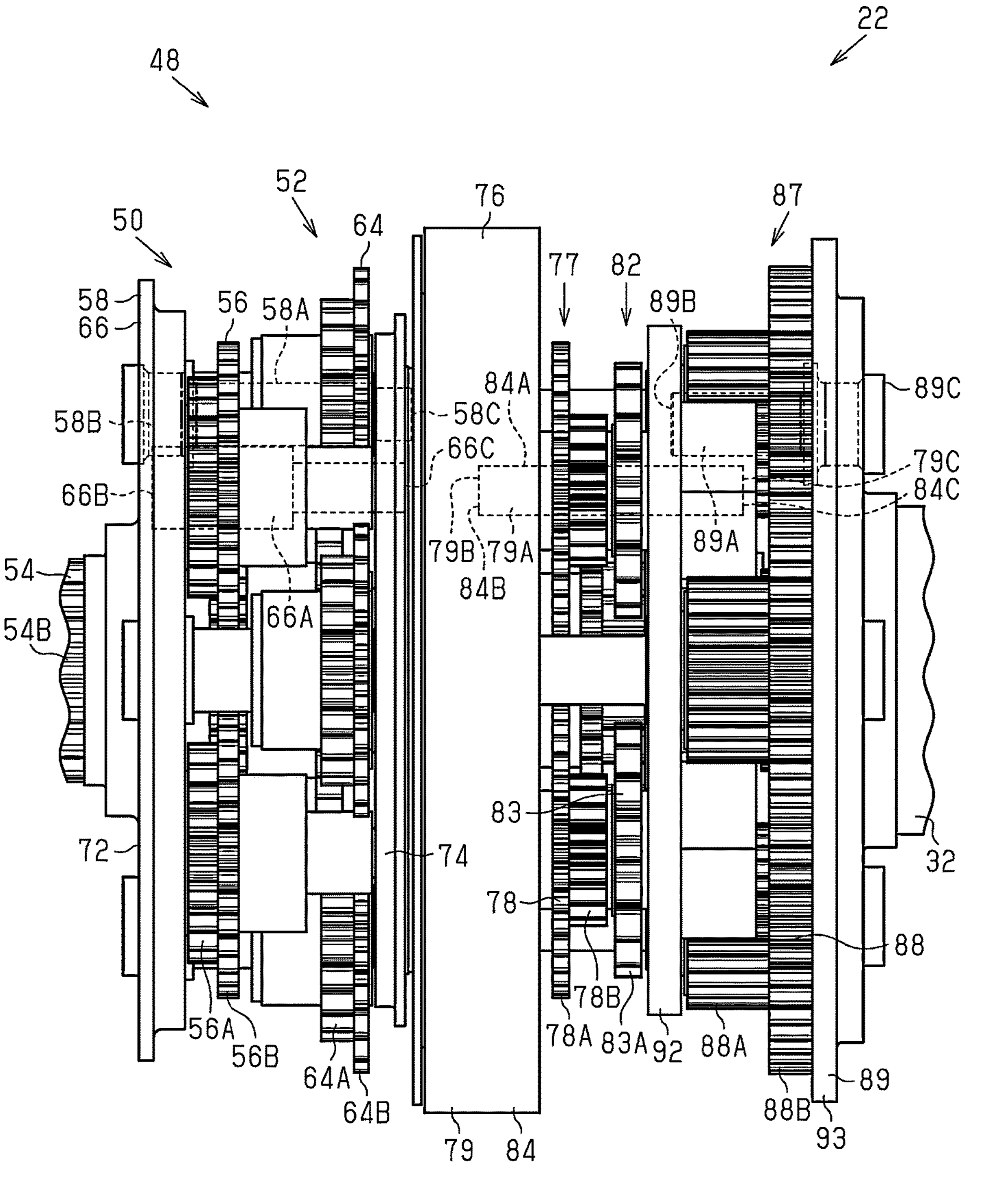
FIG. 7 is a front view of the human-powered vehicle transmission device shown in FIG. 1 without a ring gear.
Figure 8:
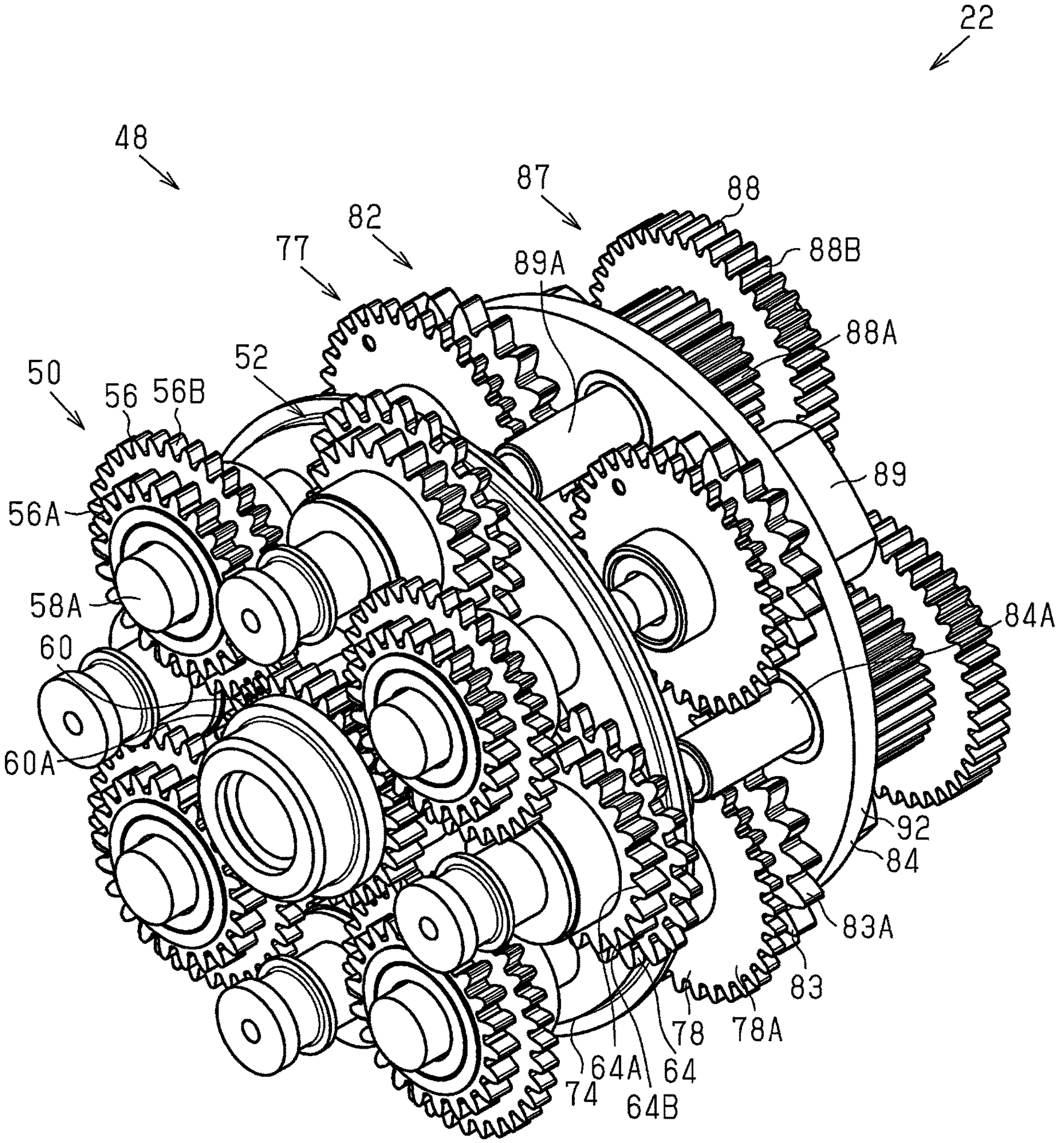
FIG. 8 is a perspective view of the human-powered vehicle transmission device shown in FIG. 1 without the ring gear.
Figure 9:
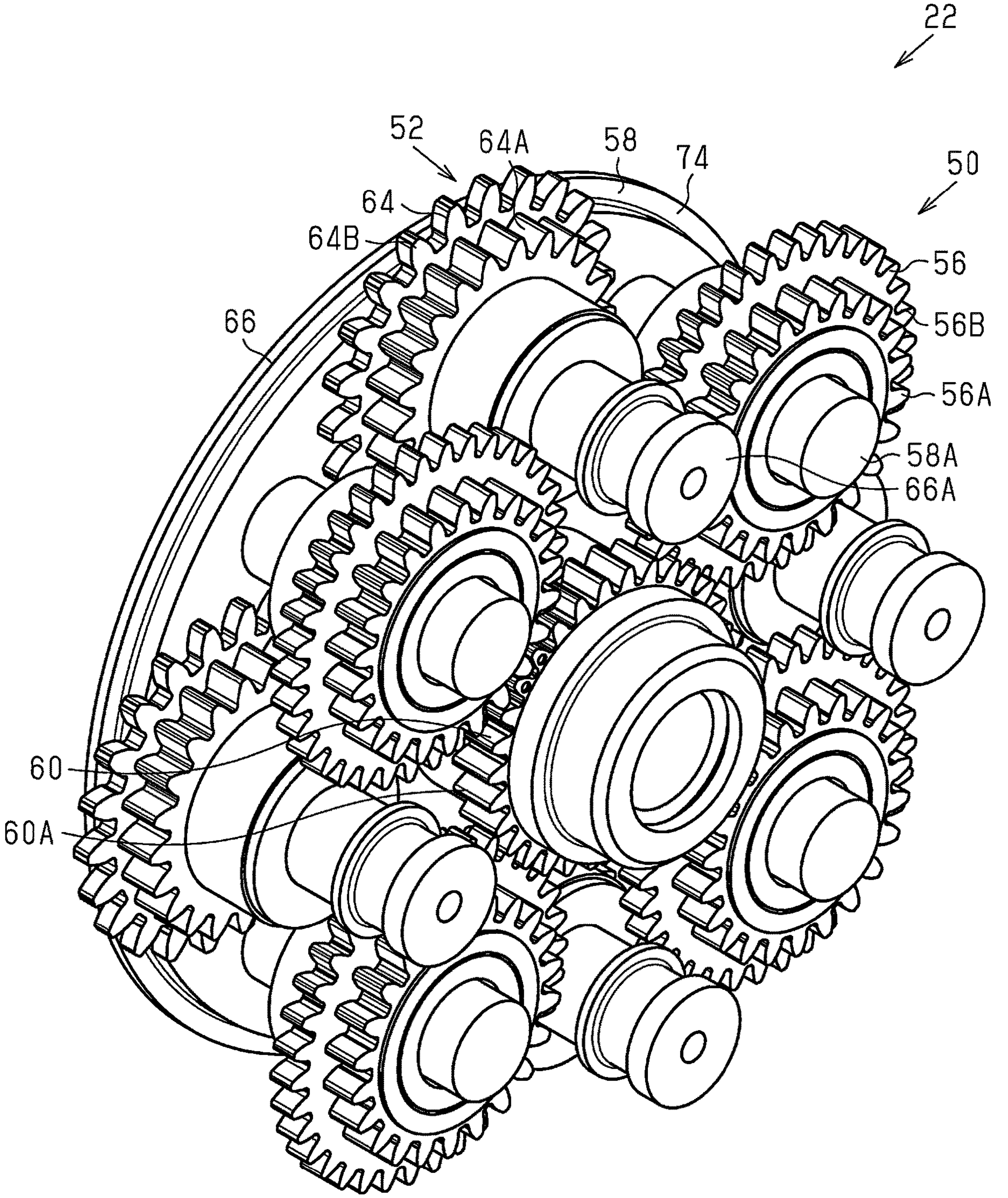
FIG. 9 is a perspective view of a first transmission unit shown in FIG. 7 without the ring gear.
Figure 10:
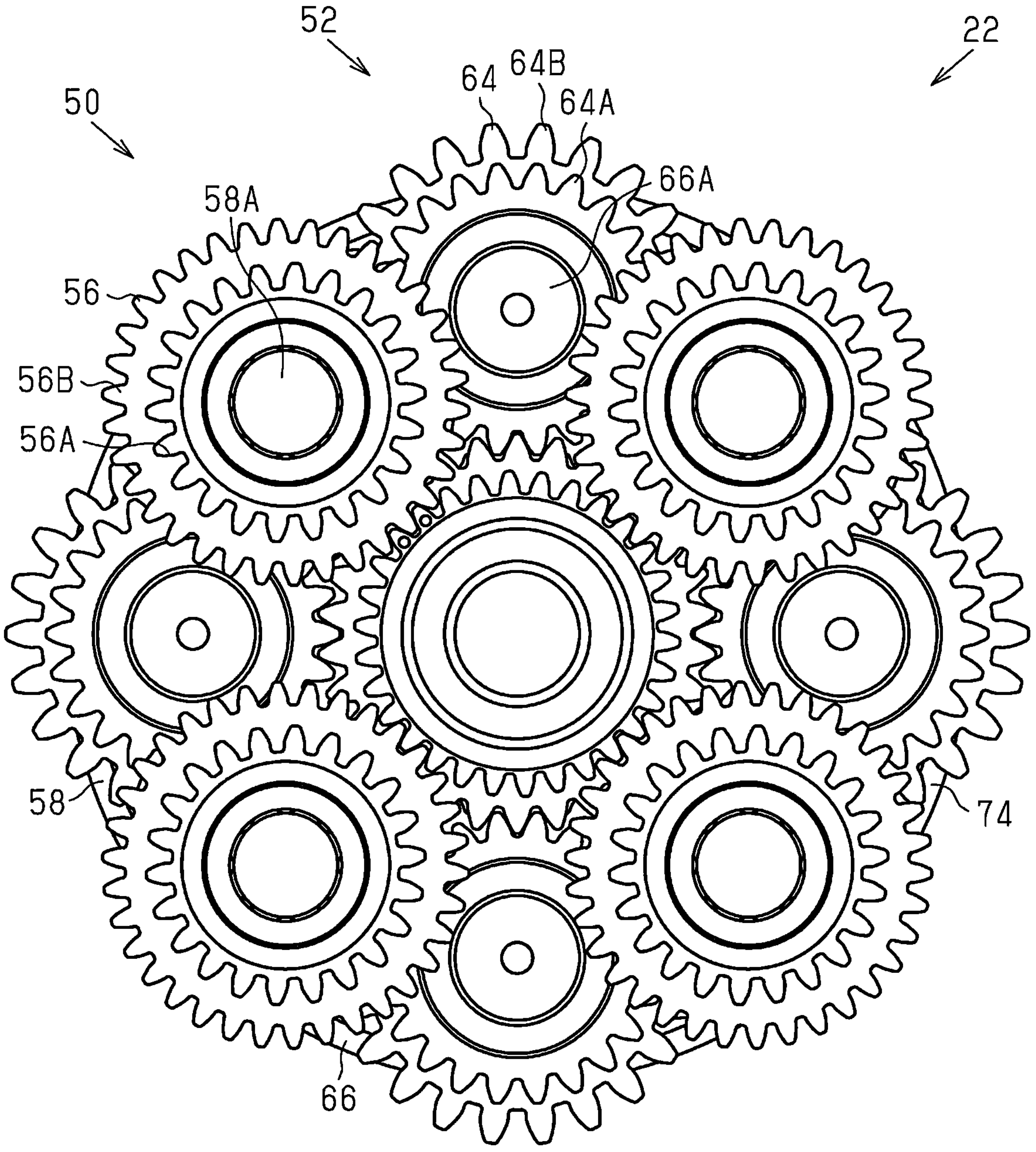
FIG. 10 is a plan view of the first transmission unit shown in FIG. 7 without the ring gear.
Figure 11:
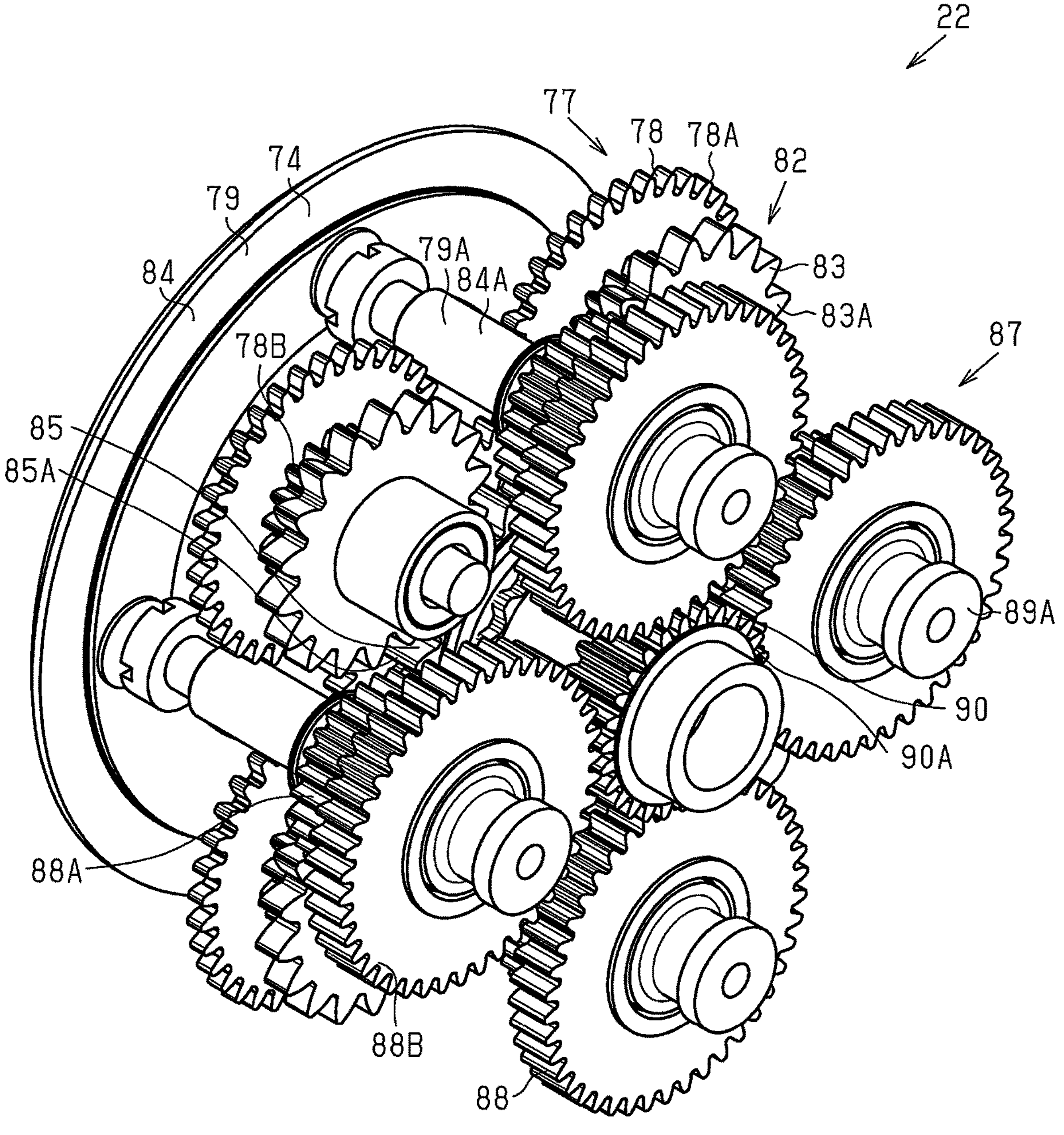
FIG. 11 is a perspective view of a second transmission unit shown in FIG. 7 without the ring gear.
Figure 12:
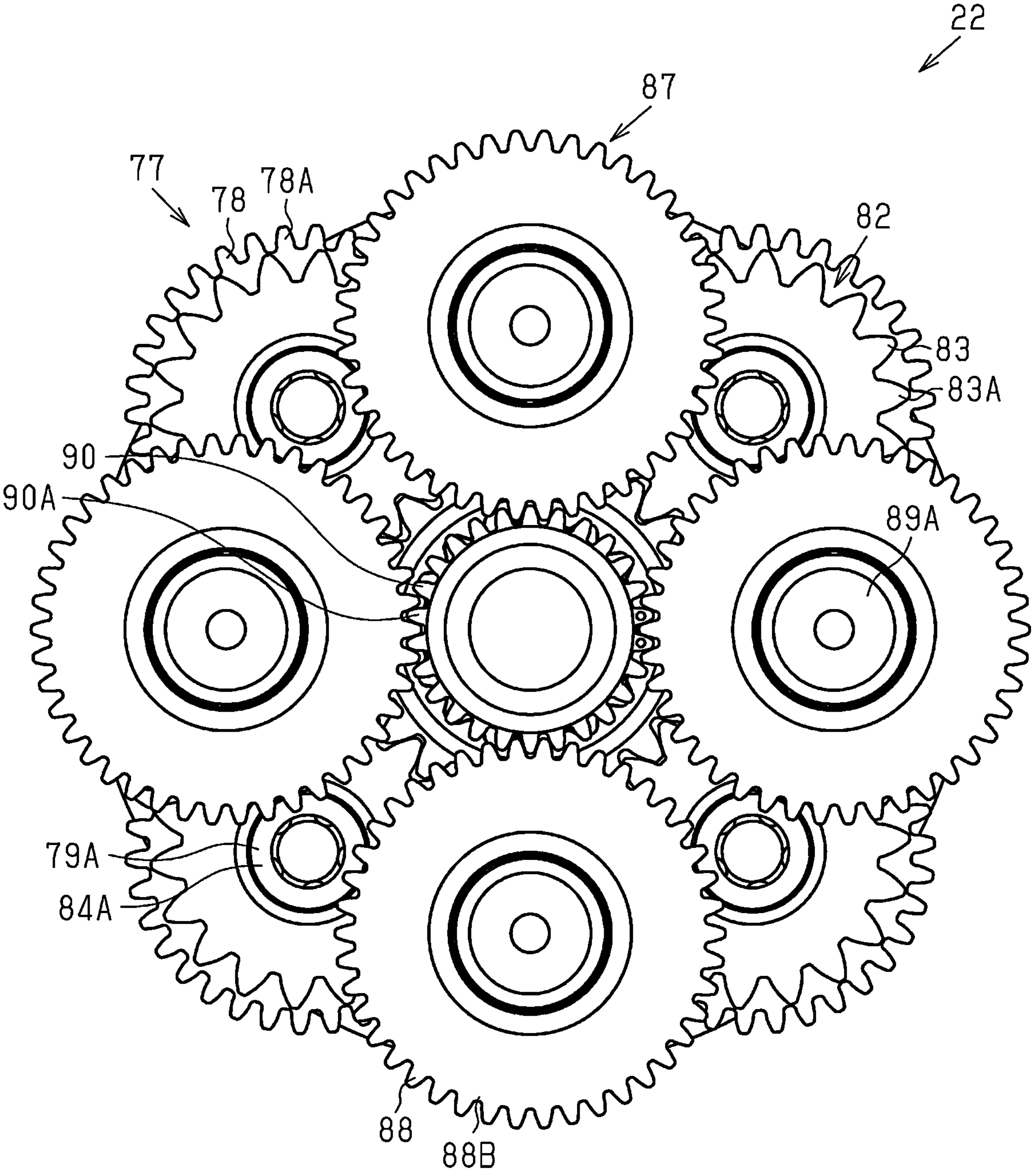
FIG. 12 is a plan view of the second transmission unit shown in FIG. 7 without the ring gear.
Figure 13:
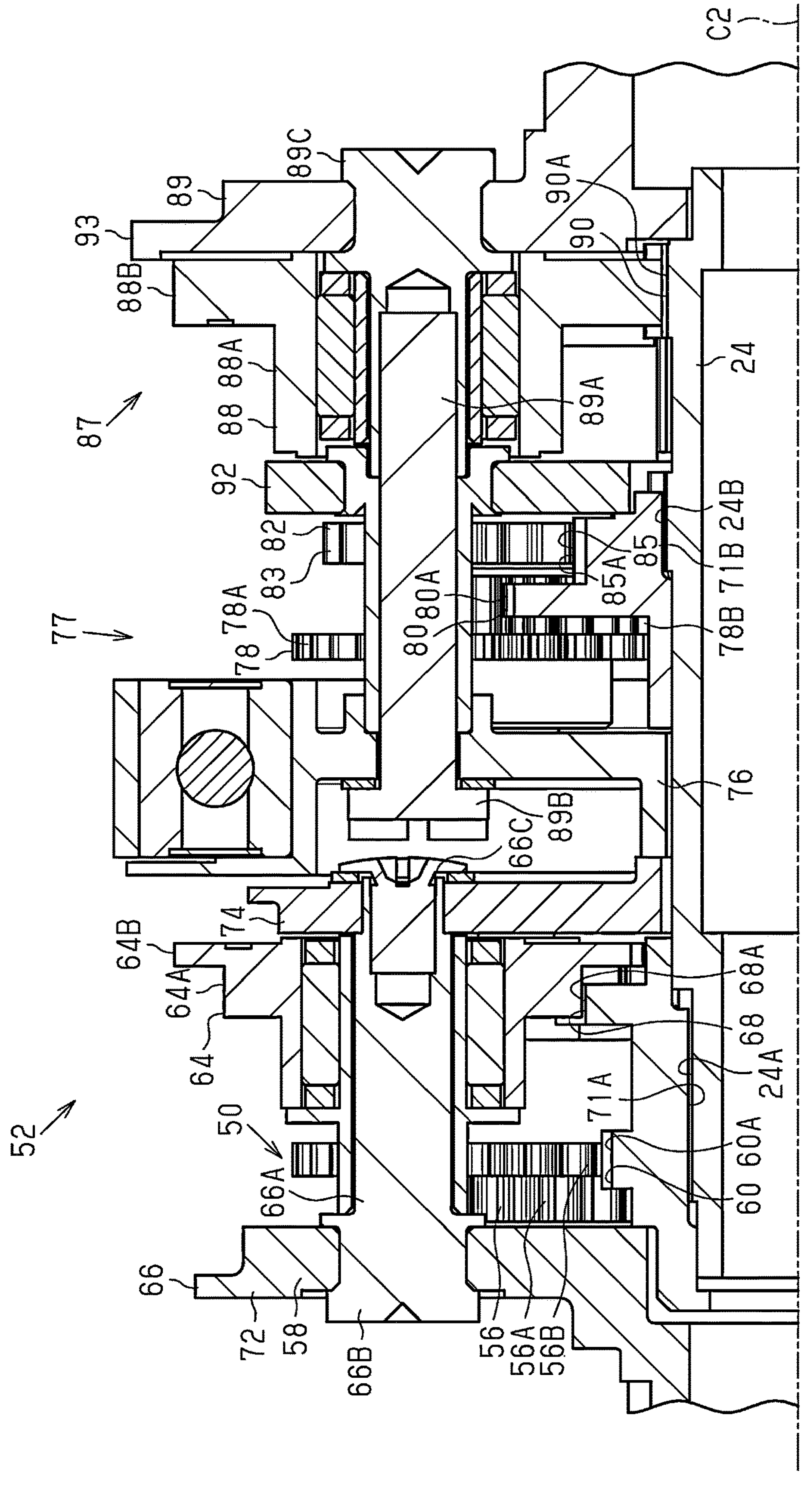
FIG. 13 is a cross-sectional view of a part of the human-powered vehicle transmission device shown in FIG. 1 and a part of the human-powered vehicle transmission device shown in FIG. 6 without the ring gear.
Figure 14:
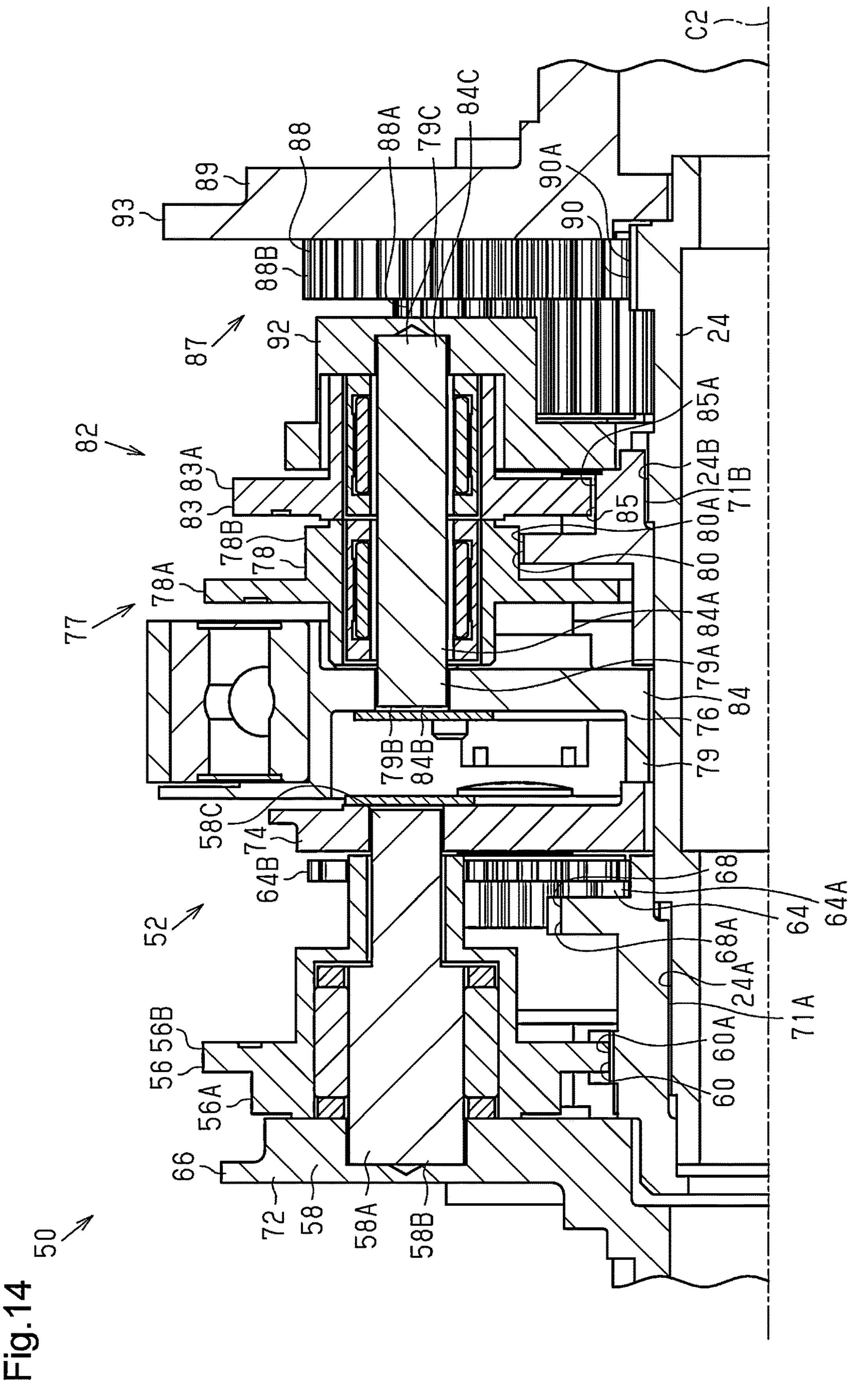
FIG. 14 is a cross-sectional view of a part of the human-powered vehicle transmission device shown in FIG. 1 and the human-powered vehicle transmission device without the ring gear taken along section line D14-D14 in FIG. 3.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A first embodiment of a transmission device 22 for a human-powered vehicle and a component 20 for a human-powered vehicle will now be described with reference to FIGS. 1 to 18.

The human-powered vehicle is a vehicle including at least one wheel and driven by at least a human driving force. The human-powered vehicle includes, for example, various types of bicycles such as a mountain bike, a road bike, a city bike, a cargo bike, a hand bike, and a recumbent bike. The number of wheels on the human-powered vehicle is not limited. The human-powered vehicle includes, for example, a unicycle and a vehicle including two or more wheels. The human-powered vehicle is not limited to a vehicle configured to be driven only by a human driving force. The human-powered vehicle includes an E-bike that uses a driving force of an electric motor in addition to a human driving force for propulsion. The E-bike includes an electric assist bicycle that assists in propulsion with an electric motor. In the embodiments described below, the human-powered vehicle refers to a bicycle.

The human-powered vehicle includes, for example, a vehicle body and a wheel. The vehicle body includes, for example, a frame. The wheel is, for example, provided on the frame. The wheel includes a front wheel and a rear wheel. The human-powered vehicle includes a crank axle 10 rotatable relative to the frame. A crank arm 12 is provided on each axial end of the crank axle 10. A pedal is coupled to each crank arm 12. The human driving force is input to the crank axle 10 from the pedals and the crank arms 12.

The component 20 is, for example, provided on a transmission path of the human driving force between the crank axle 10 and a driving wheel of the human-powered vehicle. The driving wheel includes, for example, at least one of the front wheel and the rear wheel. The driving wheel includes, for example, the rear wheel. The component 20 is disposed around an input rotational center axis C1 of the crank axle 10. The component 20 can be provided on an axle of the driving wheel.

The component 20 for a human-powered vehicle includes, for example, a transmission device 22, a shaft member 24 distanced from an input rotational shaft 28 of the human-powered vehicle, and a speed increaser 26. The transmission device 22 is arranged on the shaft member 24.

The transmission device 22 is, for example, configured to shift a final transmission ratio of the human-powered vehicle. The final transmission ratio of the human-powered vehicle refers to, for example, a ratio of rotational speed of the driving wheel to rotational speed of the crank axle 10. The final transmission ratio of a human-powered vehicle is determined based on, for example, the transmission ratio of the transmission device included in the transmission path of the human driving force, the reduction ratio of a speed reducer included in the transmission path of the human driving force, and the increase ratio of the speed increaser included in the transmission path of the human driving force.

The transmission device 22 is, for example, configured to shift the transmission ratio. The transmission device 22 is, for example, configured to select one of transmission ratios. The transmission ratio refers to, for example, a ratio of the output rotational speed from the transmission device 22 to the input rotational speed of the transmission device 22. The transmission ratio can be greater than one and less than one. The transmission ratio can be one.

In this specification, the transmission ratio, the reduction ratio, and the increase ratio are each expressed by a speed ratio R that is a ratio of the output rotational speed S2 to the input rotational speed S1 input to the corresponding device. The speed ratio R is expressed by Equation 1.

$$R = S2/S1 \qquad \text{Equation 1}$$

In a case where S1=S2, the speed ratio R is one. In a case where S1<S2, the speed ratio R is greater than one. In a case where S1>S2, the speed ratio R is less than one. The speed-increasing rate increases, for example, as the increase ratio becomes greater. The speed-decreasing rate decreases, for example, as the reduction ratio becomes greater.

The component 20 further includes, for example, the input rotational shaft 28. In an example, the human driving force is input to the input rotational shaft 28. The input rotational shaft 28 forms, for example, part of the transmission path of the human driving force. The input rotational shaft 28 includes, for example, the crank axle 10. The shaft member 24 is, for example, substantially parallel to the input rotational shaft 28. In this specification, the phrase of "substantially parallel" refers to, for example, being completely parallel and being considered to be completely parallel. The case of being considered to be completely parallel refers to, for example, a case where the function of the component 20 is not significantly affected by the non-parallel state.

The speed increaser 26 is, for example, provided in the transmission path of the human driving force. The speed increaser 26 forms, for example, part of the transmission path of the human driving force. The speed increaser 26 is, for example, connected to the input rotational shaft 28. The speed increaser 26 is, for example, configured to receive the human driving force through the input rotational shaft 28. The speed increaser 26 is, for example, configured to transmit the human driving force input to the input rotational shaft 28 to the transmission device 22. The speed increaser 26 is, for example, disposed to rotate about the rotational center axis C2 of the shaft member 24. The speed increaser 26 can be disposed to rotate about the input rotational center axis C1 of the input rotational shaft 28.

The transmission device 22 is, for example, provided in the transmission path of the human driving force. The transmission device 22 forms, for example, part of the transmission path of the human driving force. The transmission device 22 is, for example, connected to the speed increaser 26. The human driving force input to the input rotational shaft 28 is input to the transmission device 22 through the speed increaser 26. The transmission device 22 is, for example, disposed to rotate about the rotational center axis C2 of the shaft member 24.

The component 20 further includes, for example, a housing 30 and an output rotational portion 32. The output rotational portion 32 is, for example, provided on the transmission path of the human driving force. The output rotational portion 32 forms, for example, part of the transmission path of the human driving force. The output rotational portion 32 is, for example, disposed coaxially with the shaft member 24. The output rotational portion 32 is, for example, connected to the transmission device 22.

In an example, driving force output from the transmission device 22 is transmitted to the output rotational portion 32. The output rotational portion 32 is, for example, configured to output the human driving force to the driving wheel. The output rotational portion 32 is, for example, configured to transmit the driving force to the rear wheel through a linking member 14.

The component 20 further includes, for example, an output rotor 34. The output rotor 34 is, for example, configured to output the driving force that is output from the transmission device 22. The output rotor 34 is, for example, provided on the transmission path of the human driving force. The output rotor 34 forms, for example, part of the transmission path of the human driving force. The output rotor 34 is, for example, disposed coaxially with the shaft member 24. The output rotor 34 is, for example, connected to the output rotational portion 32.

The output rotor 34 is, for example, connected to the wheel by the linking member 14. The output rotational portion 32 is, for example, configured to transmit the driving force to the rear wheel through the output rotor 34 and the linking member 14. The output rotational portion 32 includes, for example, a sprocket mount 32A. The output rotor 34 includes, for example, one of a sprocket, a pulley, and a bevel gear. The linking member 14 includes, for example, at least one of a chain, a belt, and a shaft. In an example, a sprocket is mounted on the sprocket mount 32A. The sprocket mount 32A is, for example, configured to transmit driving force to the rear wheel through the sprocket and the chain.

The rotational direction of the output rotor 34 is, for example, substantially equal to the rotational direction of the input rotational shaft 28. The speed increaser 26 and the transmission device 22 are, for example, configured to rotate the output rotor 34 forward in a case where the input rotational shaft 28 rotates forward. The speed increaser 26 and the transmission device 22 can be configured to, for example, rotate the output rotor 34 rearward in a case where the input rotational shaft 28 rotates rearward. A first one-way clutch is provided on the transmission path of the human driving force between the input rotational shaft 28 and the output rotor 34. The first one-way clutch includes at least one of a roller clutch, a pawl-type clutch, and a sprag-type clutch. The first one-way clutch is, for example, provided on at least one of the speed increaser 26 and the transmission device 22. The first one-way clutch is, for example, configured to allow rotation of the input rotational shaft 28 relative to the output rotor 34 in a case where the input rotational shaft 28 rotates rearward. The forward rotational direction of the input rotational shaft 28 corresponds to, for example, the rotational direction of the input rotational shaft 28 in a case where the human-powered vehicle moves forward. The forward rotational direction of the output rotor 34 corresponds to, for example, the rotational direction of the output rotor 34 in a case where the human-powered vehicle moves forward.

Preferably, a second one-way clutch is provided in the transmission path of human driving force between the output rotational portion 32 and the rear wheel. In an example, the second one-way clutch rotates the driving wheel forward in a case where the output rotor 34 rotates forward. The second one-way clutch is, for example, configured to restrict rearward rotation of the driving wheel in a case where the output rotor 34 rotates rearward. The second one-way clutch includes, for example, at least one of a roller clutch, a pawl-type clutch, and a sprag-type clutch.

The housing 30 is, for example, configured to be mounted on the frame of the human-powered vehicle. The housing 30 includes, for example, at least one frame coupling portion 30A. The at least one frame coupling portion 30A is coupled to the frame of the human-powered vehicle by, for example, a bolt. The at least one frame coupling portion 30A includes, for example, a plurality of frame coupling portions 30A spaced apart from each other about the input rotational center axis C1. The frame coupling portions 30A are separated from one another by 90 degrees or greater about the input rotational center axis C1. The housing 30 is, for example, configured to support the input rotational shaft 28. The input rotational shaft 28 is, for example, provided on the housing 30 and is rotatable relative to the housing 30 about the input rotational center axis C1.

In an example, at least part of a driving force transmission member of the component 20 is provided on the housing 30. The driving force transmission member includes, for example, at least one of the transmission device 22, the shaft member 24, the speed increaser 26, the input rotational shaft 28, the output rotational portion 32, and the output rotor 34. In an example, the input rotational shaft 28, the speed increaser 26, and the transmission device 22 are accommodated in the housing 30. In an example, the shaft member 24 and the output rotational portion 32 are provided on the housing 30.

The component 20 includes, for example, an inner cavity 20A surrounded by the housing 30. The transmission device 22, the shaft member 24, and the speed increaser 26 are, for example, disposed in the inner cavity 20A. At least part of the input rotational shaft 28 and at least part of the output rotational portion 32 are, for example, disposed in the inner cavity 20A of the housing 30.

At least one of the transmission device 22, the speed increaser 26, the output rotational portion 32, and the output rotor 34 includes, for example, a part formed from a metal material. At least one of the transmission device 22, the speed increaser 26, the output rotational portion 32, and the output rotor 34 can include a part formed from a resin material. At least one of the transmission device 22, the speed increaser 26, the output rotational portion 32, and the output rotor 34 includes, for example, a part that forms the transmission path of human driving force and is at least partially formed from a metal material. At least one of the transmission device 22, the speed increaser 26, the output rotational portion 32, and the output rotor 34 can include a part that forms the transmission path of human driving force and is at least partially formed from a resin material.

The speed increaser 26 includes, for example, at least one first planetary gear group 36. The at least one first planetary gear group 36 is, for example, rotatable about the rotational center axis C2 of the shaft member 24. The at least one first planetary gear group 36, the transmission device 22, and the output rotor 34 are, for example, arranged in an axial direction A1 of the shaft member 24 in an order of the at least one first planetary gear group 36, the transmission device 22, and the output rotor 34.

The at least one first planetary gear group 36 includes, for example, at least one speed-increasing planetary gear 36A, a speed-increasing carrier 36B, at least one speed-increasing sun gear 36C, and at least one speed-increasing ring gear 36D. The at least one speed-increasing planetary gear 36A is, for example, disposed between the at least one speed-increasing sun gear 36C and the at least one speed-increasing ring gear 36D in a radial direction with respect to the rotational center axis C2. The at least one speed-increasing sun gear 36C is, for example, meshed with the at least one speed-increasing planetary gear 36A. The at least one speed-increasing ring gear 36D is, for example, meshed with the at least one speed-increasing planetary gear 36A.

The speed-increasing carrier 36B includes at least one speed-increasing carrier pin 36E. The speed-increasing carrier 36B, for example, supports the at least one speed-increasing planetary gear 36A with the at least one speed-increasing carrier pin 36E. The at least one speed-increasing carrier pin 36E includes two ends in the axial direction A1 defining a first speed-increasing pin end 36F and a second speed-increasing pin end 36G. The speed-increasing carrier 36B is, for example, supported on the housing 30 so that rotation of the speed-increasing carrier 36B relative to the housing 30 is restricted. The restriction of rotation of the speed-increasing carrier 36B relative to the housing 30 restricts revolution of the speed-increasing planetary gear 36A around the speed-increasing sun gear 36C.

The speed-increasing carrier 36B includes, for example, a first speed-increasing carrier portion 36H and a second speed-increasing carrier portion 36K. The first speed-increasing pin end 36F is, for example, disposed on the first speed-increasing carrier portion 36H. The second speed-increasing pin end 36G is, for example, disposed on the second speed-increasing carrier portion 36K. The at least one speed-increasing planetary gear 36A is, for example, disposed between the first speed-increasing carrier portion 36H and the second speed-increasing carrier portion 36K in the axial direction A1.

The speed increaser 26 further includes, for example, a speed-increasing unit 38 that differs from the at least one first planetary gear group 36. The speed-increasing unit 38 is, for example, configured to transmit the human driving force that is input to the input rotational shaft 28 to the at least one first planetary gear group 36.

The speed-increasing unit 38 includes, for example, a first speed-increasing gear 40 arranged coaxially with the input rotational shaft 28 and a second speed-increasing gear 42 meshed with the first speed-increasing gear 40 and arranged coaxially with the shaft member 24. The first speed-increasing gear 40 includes, for example, a spur gear. The second speed-increasing gear 42 includes, for example, a spur gear. The first speed-increasing gear 40, for example, rotates integrally with the input rotational shaft 28. The first speed-increasing gear 40 has, for example, a larger pitch circle diameter than the second speed-increasing gear 42. The second speed-increasing gear 42 and the input rotational shaft 28, for example, rotate in opposite directions. The at least one first planetary gear group 36 is, for example, located between the second speed-increasing gear 42 and the transmission device 22 in the axial direction A1 of the shaft member 24. The first speed-increasing gear 40 and the second speed-increasing gear 42 can each include a helical gear.

The speed-increasing unit 38 can include sprockets and a chain engaging the sprockets instead of or in addition to the first speed-increasing gear 40 and the second speed-increasing gear 42. The speed-increasing unit 38 can include pulleys and a belt engaging the pulleys instead of or in addition to the first speed-increasing gear 40 and the second speed-increasing gear 42.

The at least one first planetary gear group 36 includes, for example, a speed-increasing input portion 44 and a speed-increasing output portion 46. The speed-increasing input portion 44 is, for example, formed integrally with the second speed-increasing gear 42. The speed-increasing input portion 44 and the second speed-increasing gear 42 can be molded integrally so as to be a single-piece member. In a case where the speed-increasing input portion 44 and the second speed-increasing gear 42 are molded integrally, the assembling process will be simplified. The second speed-increasing gear 42 is, for example, provided on an outer circumference of the speed-increasing input portion 44. The rotational force is increased in speed by the speed-increasing unit 38 and is input to the speed-increasing input portion 44. The speed increaser 26 has a speed increasing ratio that is, for example, a ratio of the rotational speed of the speed-increasing output portion 46 to the rotational speed of the first speed-increasing gear 40.

The speed-increasing input portion 44 includes, for example, a speed-increasing ring gear 36D. The speed-increasing ring gear 36D is, for example, provided on an inner circumference of the speed-increasing input portion 44. The speed-increasing ring gear 36D is, for example, provided on a part of the speed-increasing input portion 44 differing from the second speed-increasing gear 42 in the axial direction A1. The speed-increasing ring gear 36D has, for example, a larger pitch circle diameter than the second speed-increasing gear 42. The speed-increasing output portion 46 includes, for example, the speed-increasing sun gear 36C.

The speed-increasing input portion 44 and the speed-increasing output portion 46 are, for example, configured to rotate in opposite directions. For example, the rotation of the speed-increasing carrier 36B relative to the housing 30 is restricted. Thus, the rotational force that is input to the speed-increasing ring gear 36D is output from the speed-increasing sun gear 36C as a rotational force in the opposite direction. The rotational direction of the speed-increasing input portion 44 is, for example, the same as the rotational direction of the second speed-increasing gear 42. Since the second speed-increasing gear 42 and the input rotational shaft 28 rotate in opposite directions, the speed-increasing input portion 44 and the input rotational shaft 28, for example, rotate in opposite directions. Thus, the rotational direction of the speed-increasing output portion 46 about the rotational center axis C2 of the shaft member 24 is the same as the rotational direction of the input rotational shaft 28 about the input rotational center axis C1.

In an example, the speed-increasing ratio of the speed increaser 26 is 3 or greater and 20 or less. In an example, the speed-increasing ratio of the speed increaser 26 is 5 or greater and 18 or less. In an example, the speed-increasing ratio of the speed increaser 26 is 7 or greater and 16 or less. In an example, the speed-increasing ratio of the speed increaser 26 is 9 or greater and 14 or less. In an example, the speed-increasing ratio of the speed increaser 26 is 9.4. The speed-increasing ratio of the speed increaser 26 can be 3 or greater and 11 or less. The speed-increasing ratio of the speed increaser 26 can be 6 or greater and 20 or less. In an example, the speed-increasing ratio of the speed increaser 26 is 6.032.

The transmission device 22 for a human-powered vehicle is, for example, configured to switch a transmission stage of the human-powered vehicle in steps. In an example, the transmission device 22 includes a plurality of transmission stages. In an example, the transmission stages each have a different transmission ratio. The transmission stage is changed from one transmission stage to another transmission stage to shift the transmission ratio of the transmission device 22.

The transmission device 22 includes, for example, at least one secondary planetary gear group 48. The transmission device 22 includes, for example, the shaft member 24, a first planetary gear unit 50 provided on the shaft member 24, and a second planetary gear unit 52 provided on the shaft member 24. The at least one secondary planetary gear group 48 includes, for example, the first planetary gear unit 50 and the second planetary gear unit 52.

The at least one secondary planetary gear group 48 includes, for example, a plurality of transmission planetary gears 48A. The at least one secondary planetary gear group 48 includes, for example, a plurality of transmission carriers 48B. The transmission carriers 48B support, for example, the transmission planetary gears 48A. The at least one secondary planetary gear group 48 includes, for example, a plurality of transmission sun gears 48C. The transmission sun gears 48C are, for example, meshed with the transmission planetary gears 48A. The at least one secondary planetary gear group 48 includes, for example, a plurality of transmission ring gears 48D. The transmission ring gears 48D are, for example, meshed with the transmission planetary gears 48A.

The transmission device 22 further includes, for example, the input rotational shaft 28. The input rotational shaft 28 is, for example, disposed parallel to the shaft member 24, and spaced from the shaft member 24 in a radial direction of the input rotational shaft 28.

The transmission device 22 further includes, for example, the housing 30 attachable to the frame of the human-powered vehicle. In an example, the transmission device 22 is provided on the housing 30. The transmission device 22 has a transmission rotational center axis that is, for example, substantially the same as the rotational center axis C2 of the shaft member 24.

The transmission device 22 further includes, for example, an input rotational portion 54 and the output rotational portion 32. The input rotational portion 54 is, for example, configured to transmit a rotational force from the speed-increasing output portion 46 to the transmission device 22. The input rotational portion 54 includes, for example, a first input rotational portion 54A and a second input rotational portion 54B. The first input rotational portion 54A and the second input rotational portion 54B include, for example, gears that are meshed with each other. The first input rotational portion 54A is, for example, formed integrally with the speed-increasing output portion 46. The second input rotational portion 54B is, for example, formed integrally with a first carrier portion 72.

The transmission device 22 is, for example, configured so that the ratio of the rotational speed of the output rotational portion 32 to the rotational speed of the input rotational portion 54 corresponds to the transmission ratio of the transmission device 22. The at least one secondary planetary gear group 48 is, for example, configured to output the rotational force to the output rotational portion 32. The transmission device 22 is, for example, configured to be connected to the rear wheel of the human-powered vehicle by at least one of a chain, a belt, and a shaft in a state in which the housing 30 is attached to the frame.

The transmission ratio of the transmission device 22 is, for example, a ratio of the rotational speed of the output rotational portion 32 to the rotational speed of the input rotational portion 54. In an example, the transmission device 22 is configured to shift the transmission ratio within a range from a minimum transmission ratio to a maximum transmission ratio. The minimum transmission ratio is, for example, a transmission ratio corresponding to a speed decrease. The maximum transmission ratio is, for example, a transmission ratio corresponding to a speed increase. In an example, the minimum transmission ratio is greater than 0 and less than 1. In an example, the maximum transmission ratio is greater than 1 and less than or equal to 10. As the minimum transmission ratio decreases, the speed-decreasing rate becomes larger in a case where the transmission ratio is the minimum transmission ratio. As the maximum transmission ratio increases, the speed-increasing rate becomes larger in a case where the transmission ratio is the maximum transmission ratio.

The transmission stages include, for example, a minimum transmission stage and a maximum transmission stage. The transmission ratio of the minimum transmission stage is, for example, the minimum transmission ratio. The transmission ratio of the maximum transmission stage is, for example, the maximum transmission ratio. The ratio of the maximum transmission ratio to the minimum transmission ratio is, for example, 1.2 or greater and 8 or less. In an example, the ratio of the maximum transmission ratio to the minimum transmission ratio is 1.7 or greater and 7 or less. In an example, the ratio of the maximum transmission ratio to the minimum transmission ratio is 2.4 or greater and 6 or less. In an example, the ratio of the maximum transmission ratio to the minimum transmission ratio is 2.4.

The at least one secondary planetary gear group 48 is, for example, configured to shift the transmission ratio in three or more steps. In an example, the transmission stages include three or more transmission stages. In an example, the three or more transmission stages each have a different transmission ratio.

The first planetary gear unit 50 includes, for example, at least one first planetary gear 56, a first carrier 58, at least one first sun gear 60, and at least one first ring gear 62.

The second planetary gear unit 52 includes, for example, at least one second planetary gear 64, a second carrier 66, at least one second sun gear 68, and at least one second ring gear 70.

The transmission planetary gears 48A include, for example, the at least one first planetary gear 56. The at least one first planetary gear 56 includes, for example, a plurality of first planetary gears 56. The at least one first planetary gear 56 includes, for example, a plurality of the first planetary gears 56 arranged at intervals about the rotational center axis C2 of the shaft member 24. The first planetary gears 56 are arranged at intervals about the rotational center axis C2 of the shaft member 24. The number of the first planetary gears 56 is, for example, two or greater and eight or less. In the present embodiment, the number of the first planetary gears 56 is four.

The at least one first planetary gear 56 includes, for example, a plurality of first planetary gears 56 of different diameters. The first planetary gears 56 include a first transmission planetary gear 56A and a second transmission planetary gear 56B having a larger pitch circle diameter than the first transmission planetary gear 56A. The first transmission planetary gear 56A and the second transmission planetary gear 56B are, for example, molded integrally. The first transmission planetary gear 56A and the second transmission planetary gear 56B can be formed separately and configured to rotate integrally with each other.

The transmission planetary gears 48A include, for example, the at least one second planetary gear 64. The at least one second planetary gear 64 includes, for example, a plurality of second planetary gears 64. The at least one second planetary gear 64 includes, for example, the second planetary gears 64 arranged at intervals about the rotational center axis C2 of the shaft member 24. The second planetary gears 64 are arranged at intervals about the rotational center axis C2 of the shaft member 24. The number of the second planetary gears 64 is, for example, two or greater and eight or less. In the present embodiment, the number of the second planetary gears 64 is four.

The at least one second planetary gear 64 includes, for example, the second planetary gears 64 of different diameters. The at least one second planetary gear 64 includes a third transmission planetary gear 64A and a fourth transmission planetary gear 64B having a larger pitch circle diameter than the third transmission planetary gear 64A. The third transmission planetary gear 64A and the fourth transmission planetary gear 64B are, for example, formed integrally. The third transmission planetary gear 64A and the fourth transmission planetary gear 64B can be formed separately and configured to rotate integrally with each other.

In an example, at least the one of the first planetary gears 56 having the maximum diameter is arranged overlapping the at least one second planetary gear 64 as viewed in the axial direction A1 of the shaft member 24. The one of the first planetary gears 56 having the maximum diameter includes, for example, the second transmission planetary gear 56B. Since at least the one of the first planetary gears 56 having the maximum diameter is arranged overlapping the at least one second planetary gear 64 as viewed in the axial direction A1, the transmission device 22 is reduced in size in the radial direction with respect to the rotational center axis C2. Since at least one of the first planetary gears 56 having the maximum diameter overlaps the at least one second planetary gear 64 as viewed in the axial direction A1, the housing 30 is reduced in size in the radial direction of the input rotational shaft 28.

All of the first planetary gears 56 can be, for example, arranged overlapping the second planetary gears 64 as viewed in the axial direction A1. All of the first planetary gears 56 can be arranged so as not to overlap any of the second planetary gears 64 as viewed in the axial direction A1.

In an example, at least the one of the second planetary gears 64 having the maximum diameter is arranged overlapping the at least one first planetary gear 56 as viewed in the axial direction A1 of the shaft member 24. The one of the second planetary gears 64 having the maximum diameter includes, for example, the fourth transmission planetary gear 64B. Since at least the one of the second planetary gears 64 having the maximum diameter is arranged overlapping the at least one first planetary gear 56 as viewed in the axial direction A1, the transmission device 22 is reduced in size in the radial direction with respect to the rotational center axis C2. Since at least the one of the second planetary gears 64 having the maximum diameter is arranged overlapping the at least one first planetary gear 56 as viewed in the axial direction A1, the housing 30 is reduced in size in the radial direction of the input rotational shaft 28.

All of the second planetary gears 64 can be, for example, arranged overlapping the first planetary gears 56 as viewed in the axial direction A1. All of the second planetary gears 64 can be arranged so as not to overlap any of the first planetary gears 56 as viewed in the axial direction A1.

The transmission carriers 48B include, for example, the first carrier 58. The first carrier 58 includes, for example, the first carrier portion 72 and a second carrier portion 74. The input rotational portion 54 is, for example, connected to the first carrier 58. The input rotational portion 54 is, for example, formed integrally with the first carrier portion 72.

The first carrier 58 includes, for example, at least one first carrier pin 58A and supports the at least one first planetary gear 56 with the at least one first carrier pin 58A. The at least one first planetary gear 56 is, for example, disposed between the first carrier portion 72 and the second carrier portion 74 in the axial direction A1 of the shaft member 24. The at least one first planetary gear 56 is, for example, rotatably supported by the at least one first carrier pin 58A. The at least one first planetary gear 56 can be rotatably supported by the at least one first carrier pin 58A via a bearing.

The at least one first carrier pin 58A is, for example, supported by the first carrier portion 72 and the second carrier portion 74. The at least one first carrier pin 58A includes, for example, a plurality of first carrier pins 58A. Each of the first carrier pins 58A includes two ends in the axial direction A1 defining a first pin end 58B and a second pin end 58C. The first pin end 58B is, for example, supported by the first carrier portion 72. The second pin end 58C is, for example, supported by the second carrier portion 74.

In an example, the first pin end 58B can be fixed to the first carrier portion 72, and the second pin end 58C can be fixed to the second carrier portion 74. In an example, the first pin end 58B can be rotatably supported by the first carrier portion 72, and the second pin end 58C is rotatably supported by the second carrier portion 74. In a case where the first pin end 58B is rotatably supported by the first carrier portion 72 and the second pin end 58C is rotatably supported by the second carrier portion 74, the at least one first planetary gear 56 can be non-rotatably supported by the at least one first carrier pin 58A.

The transmission carriers 48B include, for example, the second carrier 66. The second carrier 66 includes, for example, the first carrier portion 72 and the second carrier portion 74. A part of the first carrier 58 is, for example, formed integrally with a part of the second carrier 66. A part of the first carrier 58 is, for example, molded integrally with a part of the second carrier 66. The first carrier portion 72 is, for example, a part of the first carrier 58 and a part of the second carrier 66. The second carrier portion 74 is, for example, a part of the first carrier 58 and a part of the second carrier 66.

The second carrier 66 includes, for example, at least one second carrier pin 66A, and supports the at least one second planetary gear 64 with the at least one second carrier pin 66A. The at least one second planetary gear 64 is, for example, disposed between the first carrier portion 72 and the second carrier portion 74 in the axial direction A1 of the shaft member 24. The at least one second planetary gear 64 is, for example, rotatably supported by the at least one second carrier pin 66A. The at least one second planetary gear 64 can be rotatably supported by the at least one second carrier pin 66A via a bearing.

The at least one second carrier pin 66A is, for example, supported by the first carrier portion 72 and the second carrier portion 74. The at least one second carrier pin 66A includes, for example, a plurality of second carrier pins 66A. The second carrier pins 66A each include two ends in the axial direction A1 defining a third pin end 66B and a fourth pin end 66C. The third pin end 66B is, for example, supported by the first carrier portion 72. The fourth pin end 66C is, for example, supported by the second carrier portion 74. In an example, the third pin end 66B can be fixed to the first carrier portion 72, and the fourth pin end 66C can be fixed to the second carrier portion 74. In an example, the third pin end 66B can be rotatably supported by the first carrier portion 72, and the fourth pin end 66C can be rotatably supported by the second carrier portion 74. In a case where the third pin end 66B is rotatably supported by the first carrier portion 72 and the fourth pin end 66C is rotatably supported by the second carrier portion 74, the at least one second planetary gear 64 can be non-rotatably supported by the at least one second carrier pin 66A.

The second carrier 66 can include, for example, a third carrier portion 76 and at least one of the first carrier portion 72 and the second carrier portion 74. In a case where the second carrier 66 includes the third carrier portion 76 and at least one of the first carrier portion 72 and the second carrier portion 74, the at least one second carrier pin 66A is supported by the third carrier portion 76 and at least one of the first carrier portion 72 and the second carrier portion 74. The second carrier portion 74 is, for example, disposed between the first carrier portion 72 and the third carrier portion 76 in the axial direction A1 of the shaft member 24. An intermediate portion of the at least one second carrier pin 66A is, for example, supported by the second carrier portion 74.

In a case where the second carrier 66 includes the third carrier portion 76 and at least one of the first carrier portion 72 and the second carrier portion 74, for example, the third pin end 66B is supported by the first carrier portion 72, and the fourth pin end 66C is supported by the third carrier portion 76. The at least one first planetary gear 56 is, for example, disposed between the first carrier portion 72 and the second carrier portion 74. The at least one second planetary gear 64 is, for example, disposed between the second carrier portion 74 and the third carrier portion 76.

The at least one first carrier pin 58A is, for example, a member separate from the at least one second carrier pin 66A and arranged at a distance from the at least one second carrier pin 66A. The at least one first carrier pin 58A includes, for example, the first carrier pins 58A corresponding to the first planetary gears 56. The at least one second carrier pin 66A includes, for example, the second carrier pins 66A corresponding to the second planetary gears 64. The first carrier pins 58A and the second carrier pins 66A are, for example, arranged alternately at equal intervals about the rotational center axis C2 of the shaft member 24.

In a plane that extends perpendicular to the rotational center axis C2 of the shaft member 24, the distance between the at least one first carrier pin 58A and the rotational center axis C2 of the shaft member 24 is, for example, equal to the distance between the at least one second carrier pin 66A and the rotational center axis C2 of the shaft member 24. In a plane that extends perpendicular to the rotational center axis C2 of the shaft member 24, the distance between the at least one first carrier pin 58A and the rotational center axis C2 of the shaft member 24 can differ from the distance between the at least one second carrier pin 66A and the rotational center axis C2 of the shaft member 24.

Figure 15:
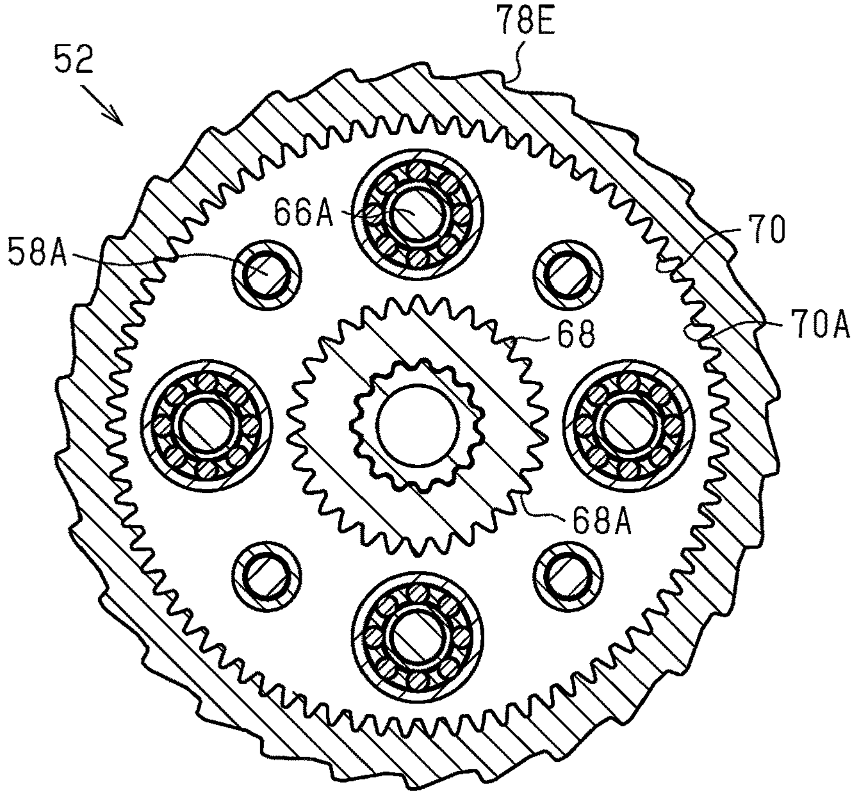
FIG. 15 is a cross-sectional view of the transmission device taken along section line D15-D15 in FIG. 6.

The at least one first carrier pin 58A and the at least one second carrier pin 66A are, for example, arranged overlapping a first plane that extends perpendicular to the shaft member 24. The first plane, for example, extends perpendicular to the shaft member 24 and includes the at least one first carrier pin 58A and the at least one second carrier pin 66A. For example, the entirety of a plane that extends perpendicular to the shaft member 24 and includes the at least one first carrier pin 58A and the at least one second carrier pin 66A corresponds to the first plane. FIG. 15 is a cross-sectional view of the transmission device 22 taken along an example of the first plane.

The transmission sun gears 48C include, for example, the at least one first sun gear 60 and the at least one second sun gear 68. The at least one first sun gear 60 is, for example, meshed with the at least one first planetary gear 56. The at least one first sun gear 60 includes, for example, a first transmission sun gear 60A. The first transmission sun gear 60A is, for example, meshed with the second transmission planetary gear 56B.

The at least one second sun gear 68 is, for example, meshed with the at least one second planetary gear 64. The at least one second sun gear 68 includes, for example, a second transmission sun gear 68A. The second transmission sun gear 68A is, for example, meshed with the third transmission planetary gear 64A. The rotational center axis of the at least one first sun gear 60 and the rotational center axis of the at least one second sun gear 68 are, for example, substantially equal to the rotational center axis C2 of the shaft member 24.

The at least one first sun gear 60 and the at least one second sun gear 68 are, for example, formed integrally. The first transmission sun gear 60A and the second transmission sun gear 68A are, for example, molded integrally. The at least one first sun gear 60 and the at least one second sun gear 68 can be formed separately and configured to rotate integrally.

The at least one first sun gear 60 and the at least one second sun gear 68 are, for example, formed separately from the shaft member 24, and configured to rotate integrally with the shaft member 24. The first transmission sun gear 60A and the second transmission sun gear 68A are, for example, formed on an outer circumference of a first tubular member. For example, a first engagement portion 71A is formed on an inner circumference of the first tubular member. The first engagement portion 71A includes, for example, splines or serrations. The first engagement portion 71A engages, for example, a first shaft member engagement 24A of the shaft member 24. The first shaft member engagement 24A includes, for example, splines or serrations. The first shaft member engagement 24A is, for example, molded integrally with the shaft member 24. The at least one first sun gear 60 and the at least one second sun gear 68 can be molded integrally with the shaft member 24.

The at least one first sun gear 60 and the at least one second sun gear 68 are, for example, configured to rotate integrally in at least a first direction B1 about the rotational center axis C2 of the shaft member 24. The at least one first sun gear 60 and the at least one second sun gear 68 can be configured to rotate integrally in a second direction B2, which is opposite to the first direction B1, about the rotational center axis C2 of the shaft member 24.

The transmission ring gears 48D include, for example, the at least one first ring gear 62. The at least one first ring gear 62 is, for example, meshed with the at least one first planetary gear 56. The at least one first ring gear 62 includes, for example, a plurality of first ring gears 62 that are rotatable independently from each other. The first planetary gears 56 are, for example, each meshed with first ring gears 62.

The first ring gears 62 include, for example, a first transmission ring gear 62A and a second transmission ring gear 62B. The first transmission ring gear 62A is, for example, meshed with the first transmission planetary gear 56A. The second transmission ring gear 62B is, for example, meshed with the second transmission planetary gear 56B.

The transmission ring gears 48D include, for example, the at least one second ring gear 70. The at least one second ring gear 70 is, for example, meshed with the at least one second planetary gear 64. The at least one second ring gear 70 includes, for example, a plurality of second ring gears 70 that are rotatable independently from each other. The second planetary gears 64 are, for example, each meshed with second ring gears 70.

The second ring gears 70 include, for example, a third transmission ring gear 70A and a fourth transmission ring gear 70B. The third transmission ring gear 70A is, for example, meshed with the third transmission planetary gear 64A. The fourth transmission ring gear 70B is, for example, meshed with the fourth transmission planetary gear 64B.

The transmission device 22 further includes, for example, a third planetary gear unit 77 provided on the shaft member 24. The transmission device 22 includes, for example, a fourth planetary gear unit 82 provided on the shaft member 24 and a fifth planetary gear unit 87 provided on the shaft member 24. The at least one secondary planetary gear group 48 further includes, for example, the third planetary gear unit 77, the fourth planetary gear unit 82, and the fifth planetary gear unit 87.

The third planetary gear unit 77 includes, for example, at least one third planetary gear 78, a third carrier 79, at least one third sun gear 80, and at least one third ring gear 81.

The fourth planetary gear unit 82 includes, for example, at least one fourth planetary gear 83, a fourth carrier 84, at least one fourth sun gear 85, and at least one fourth ring gear 86.

The fifth planetary gear unit 87 includes, for example, at least one fifth planetary gear 88, a fifth carrier 89, at least one fifth sun gear 90, and at least one fifth ring gear 91.

The transmission planetary gears 48A include, for example, the at least one third planetary gear 78. The at least one third planetary gear 78 includes, for example, a plurality of third planetary gears 78 arranged at intervals about the rotational center axis C2 of the shaft member 24. The at least one third planetary gears 78 are arranged at intervals about the rotational center axis C2 of the shaft member 24. The number of the at least one third planetary gears 78 is, for example, two or greater and eight or less. In the present embodiment, the number of the at least one third planetary gears 78 is four.

The at least one third planetary gears 78 include, for example, a fifth transmission planetary gear 78A and a sixth transmission planetary gear 78B having a smaller pitch circle diameter than the fifth transmission planetary gear 78A. The fifth transmission planetary gear 78A and the sixth transmission planetary gear 78B are, for example, molded integrally. The fifth transmission planetary gear 78A and the sixth transmission planetary gear 78B are formed separately and configured to rotate integrally with each other.

The transmission planetary gears 48A include, for example, the at least one fourth planetary gear 83. The at least one fourth planetary gear 83 includes, for example, a plurality of fourth planetary gears 83 arranged at intervals about the rotational center axis C2 of the shaft member 24. The fourth planetary gears 83 are arranged at intervals about the rotational center axis C2 of the shaft member 24. The number of the fourth planetary gears 83 is, for example, two or more and eight or less. In the present embodiment, the number of the fourth planetary gears 83 is four. The fourth planetary gears 83 include, for example, a seventh transmission planetary gear 83A. The seventh transmission planetary gear 83A has a pitch circle diameter that is, for example, smaller than the pitch circle diameter of the fifth transmission planetary gear 78A and greater than the pitch circle diameter of the sixth transmission planetary gear 78B.

The transmission planetary gears 48A include, for example, the at least one fifth planetary gear 88. The at least one fifth planetary gear 88 includes, for example, a plurality of fifth planetary gears 88 arranged at intervals about the rotational center axis C2 of the shaft member 24. The fifth planetary gears 88 are arranged at intervals about the rotational center axis C2 of the shaft member 24. The number of the fifth planetary gears 88 is, for example, two or more and eight or less. In the present embodiment, the number of the fifth planetary gears 88 is four.

The fifth planetary gears 88 include, for example, an eighth transmission planetary gear 88A and a ninth transmission planetary gear 88B having a larger pitch circle diameter than the eighth transmission planetary gear 88A. The eighth transmission planetary gear 88A and the ninth transmission planetary gear 88B are, for example, molded integrally. The eighth transmission planetary gear 88A and the ninth transmission planetary gear 88B are formed separately and configured to rotate integrally with each other.

In an example, at least one of the at least one third planetary gear 78 having the maximum diameter is arranged overlapping at least one of the at least one first planetary gear 56, the at least one second planetary gear 64, the at least one fourth planetary gear 83, and the at least one fifth planetary gear 88 as viewed in the axial direction A1 of the shaft member 24. The one of the at least one third planetary gears 78 having the maximum diameter includes, for example, the fifth transmission planetary gear 78A. All of the at least one third planetary gear 78 can be arranged so as not to overlap any of the at least one first planetary gear 56, the at least one second planetary gear 64, the at least one fourth planetary gear 83, and the at least one fifth planetary gear 88 as viewed in the axial direction A1.

At least one of the at least one fourth planetary gear 83 having the maximum diameter is, for example, arranged overlapping at least one of the at least one first planetary gear 56, the at least one second planetary gear 64, the at least one third planetary gear 78, and the at least one fifth planetary gear 88 as viewed in the axial direction A1. The one of the at least one fourth planetary gear 83 having the maximum diameter includes the seventh transmission planetary gear 83A. All of the at least one fourth planetary gear 83 can be arranged so as not to overlap any of the at least one first planetary gear 56, the at least one second planetary gear 64, the at least one third planetary gear 78, and the at least one fifth planetary gear 88 as viewed in the axial direction A1.

At least one of the at least one fifth planetary gear 88 having the maximum diameter is, for example, arranged overlapping at least one of the at least one first planetary gear 56, the at least one second planetary gear 64, the at least one third planetary gear 78, and the at least one fourth planetary gear 83 as viewed in the axial direction A1. The one of the at least one fifth planetary gear 88 having the maximum diameter includes, for example, the ninth transmission planetary gear 88B. All of the at least one fifth planetary gear 88 can be arranged so as not to overlap any of the at least one first planetary gear 56, the at least one second planetary gear 64, the at least one third planetary gear 78, and the at least one fourth planetary gear 83 as viewed in the axial direction A1.

The transmission carriers 48B further includes, for example, the third carrier 79. The third carrier 79 includes, for example, the third carrier portion 76 and a fourth carrier portion 92. The at least one third planetary gear 78 is, for example, disposed between the third carrier portion 76 and the fourth carrier portion 92 in the axial direction A1.

The third carrier 79 includes, for example, at least one third carrier pin 79A and supports the at least one third planetary gear 78 with the at least one third carrier pin 79A. The at least one third carrier pin 79A can be, for example, formed integrally with the at least one first carrier pin 58A or the at least one second carrier pin 66A. The at least one third planetary gear 78 is, for example, rotatably supported by the at least one third carrier pin 79A. The at least one third planetary gear 78 can be rotatably supported by the at least one third carrier pin 79A via a bearing.

The at least one third carrier pin 79A is, for example, supported by the third carrier portion 76 and the fourth carrier portion 92. The at least one third carrier pin 79A includes, for example, a plurality of third carrier pins 79A. The third carrier pins 79A each include two ends in the axial direction A1 defining a fifth pin end 79B and a sixth pin end 79C. The fifth pin end 79B is, for example, supported by the third carrier portion 76. The sixth pin end 79C is, for example, supported by the fourth carrier portion 92.

In an example, the fifth pin end 79B can be fixed to the third carrier portion 76, and the sixth pin end 79C can be fixed to the fourth carrier portion 92. In an example, the fifth pin end 79B can be rotatably supported by the third carrier portion 76, and the sixth pin end 79C can be rotatably supported by the fourth carrier portion 92. In a case where the fifth pin end 79B is fixed to the third carrier portion 76 and the sixth pin end 79C is rotatably supported by the fourth carrier portion 92, the at least one third planetary gear 78 can be non-rotatably supported by the at least one third carrier pin 79A.

The transmission carriers 48B further include, for example, the fourth carrier 84. The fourth carrier 84 includes, for example, the third carrier portion 76 and the fourth carrier portion 92. The at least one fourth planetary gear 83 is, for example, disposed between the third carrier portion 76 and the fourth carrier portion 92 in the axial direction A1.

The fourth carrier 84 includes, for example, at least one fourth carrier pin 84A and supports the at least one fourth planetary gear 83 with the at least one fourth carrier pin 84A. The at least one fourth planetary gear 83 is, for example, rotatably supported by the at least one fourth carrier pin 84A. The at least one fourth planetary gear 83 can be rotatably supported by the at least one fourth carrier pin 84A via a bearing.

The at least one fourth carrier pin 84A is, for example, supported by the third carrier portion 76 and the fourth carrier portion 92. The at least one fourth carrier pin 84A includes, for example, a plurality of fourth carrier pins 84A. The fourth carrier pins 84A each include two ends in the axial direction A1 defining a seventh pin end 84B and an eighth pin end 84C. The seventh pin end 84B is, for example, supported by the third carrier portion 76. The eighth pin end 84C is, for example, supported by the fourth carrier portion 92.

In an example, the seventh pin end 84B can be fixed to the third carrier portion 76, and the eighth pin end 84C can be fixed to the fourth carrier portion 92. In an example, the seventh pin end 84B can be rotatably supported by the third carrier portion 76, and the eighth pin end 84C can be rotatably supported by the fourth carrier portion 92. In a case where the seventh pin end 84B is rotatably supported by the third carrier portion 76 and the eighth pin end 84C is rotatably supported by the fourth carrier portion 92, the at least one fourth planetary gear 83 can be non-rotatably supported by the at least one fourth carrier pin 84A.

The transmission carriers 48B further include, for example, the fifth carrier 89. The fifth carrier 89 includes, for example, the third carrier portion 76, the fourth carrier portion 92, and a fifth carrier portion 93. The output rotational portion 32 includes, for example, the fifth carrier 89. The output rotational portion 32 is, for example, molded integrally with the fifth carrier portion 93. The output rotational portion 32 and the fifth carrier portion 93 can be formed separately and configured to rotate integrally with each other.

The fifth carrier 89 includes, for example, at least one fifth carrier pin 89A and supports the at least one fifth planetary gear 88 with the at least one fifth carrier pin 89A. The at least one fifth planetary gear 88 is, for example, disposed between the fourth carrier portion 92 and the fifth carrier portion 93 in the axial direction A1. The at least one fifth planetary gear 88 is, for example, rotatably supported by the at least one fifth carrier pin 89A. The at least one fifth planetary gear 88 can be rotatably supported by the at least one fifth carrier pin 89A via a bearing.

In an example, the third carrier 79 can be the same as the fourth carrier 84. The third carrier 79 can differ from the fourth carrier 84. Part of the third carrier 79 is, for example, formed integrally with part of the fifth carrier 89. Part of the fourth carrier 84 is formed integrally with part of the fifth carrier 89. Part of the fourth carrier 84 can be molded integrally with part of the fifth carrier 89.

The at least one fifth carrier pin 89A is, for example, supported by the third carrier portion 76, the fourth carrier portion 92, and the fifth carrier portion 93. The at least one fifth carrier pin 89A includes, for example, a plurality of fifth carrier pins 89A. The fifth carrier pins 89A each include two ends in the axial direction A1 defining a ninth pin end 89B and a tenth pin end 89C. The ninth pin end 89B is, for example, supported by the third carrier portion 76. The tenth pin end 89C is, for example, supported by the fifth carrier portion 93. The fourth carrier portion 92 is, for example, disposed between the third carrier portion 76 and the fifth carrier portion 93. The fourth carrier portion 92 supports, for example, a portion of the at least one fifth carrier pin 89A between the third carrier portion 76 and the fifth carrier portion 93.

In an example, the ninth pin end 89B can be fixed to the third carrier portion 76, and the tenth pin end 89C can be fixed to the fifth carrier portion 93. In an example, the ninth pin end 89B can be rotatably supported by the third carrier portion 76, and the tenth pin end 89C can be rotatably supported by the fifth carrier portion 93. In a case where the ninth pin end 89B is rotatably supported by the third carrier portion 76 and the tenth pin end 89C is rotatably supported by the fifth carrier portion 93, the at least one fifth planetary gear 88 can be non-rotatably supported by the at least one fifth carrier pin 89A.

The at least one third carrier pin 79A is, for example, a member molded separately from the at least one fifth carrier pin 89A and arranged at a distance from the at least one fifth carrier pin 89A. The at least one third carrier pin 79A includes, for example, the third carrier pins 79A corresponding to the at least one third planetary gears 78. The at least one fifth carrier pin 89A includes, for example, the fifth carrier pins 89A corresponding to the fifth planetary gears 88. The third carrier pins 79A and the fifth carrier pins 89A are, for example, arranged at equal intervals about the rotational center axis C2 of the shaft member 24.

The at least one fourth carrier pin 84A is, for example, a member molded separately from the at least one fifth carrier pin 89A and arranged at a distance from the at least one fifth carrier pin 89A. The at least one fourth carrier pin 84A includes, for example, a plurality of the fourth carrier pins 84A corresponding to the fourth planetary gears 83. The fourth carrier pins 84A and the fifth carrier pins 89A are, for example, arranged at equal intervals about the rotational center axis C2 of the shaft member 24.

In a plane that extends perpendicular to the rotational center axis C2 of the shaft member 24, the distance between the at least one third carrier pin 79A and the rotational center axis C2 of the shaft member 24 is, for example, substantially equal to the distance between the at least one fifth carrier pin 89A and the rotational center axis C2 of the shaft member 24. In a plane that extends perpendicular to the rotational center axis C2 of the shaft member 24, the distance between the at least one third carrier pin 79A and the rotational center axis C2 of the shaft member 24 can differ from the distance between the at least one fifth carrier pin 89A and the rotational center axis C2 of the shaft member 24.

In a plane that extends perpendicular to the rotational center axis C2 of the shaft member 24, the distance between the at least one fourth carrier pin 84A and the rotational center axis C2 of the shaft member 24 is, for example, substantially equal to the distance between the at least one fifth carrier pin 89A and the rotational center axis C2 of the shaft member 24. In a plane that extends perpendicular to the rotational center axis C2 of the shaft member 24, the distance between the at least one fourth carrier pin 84A and the rotational center axis C2 of the shaft member 24 can differ from the distance between the at least one fifth carrier pin 89A and the rotational center axis C2 of the shaft member 24.

Figure 16:
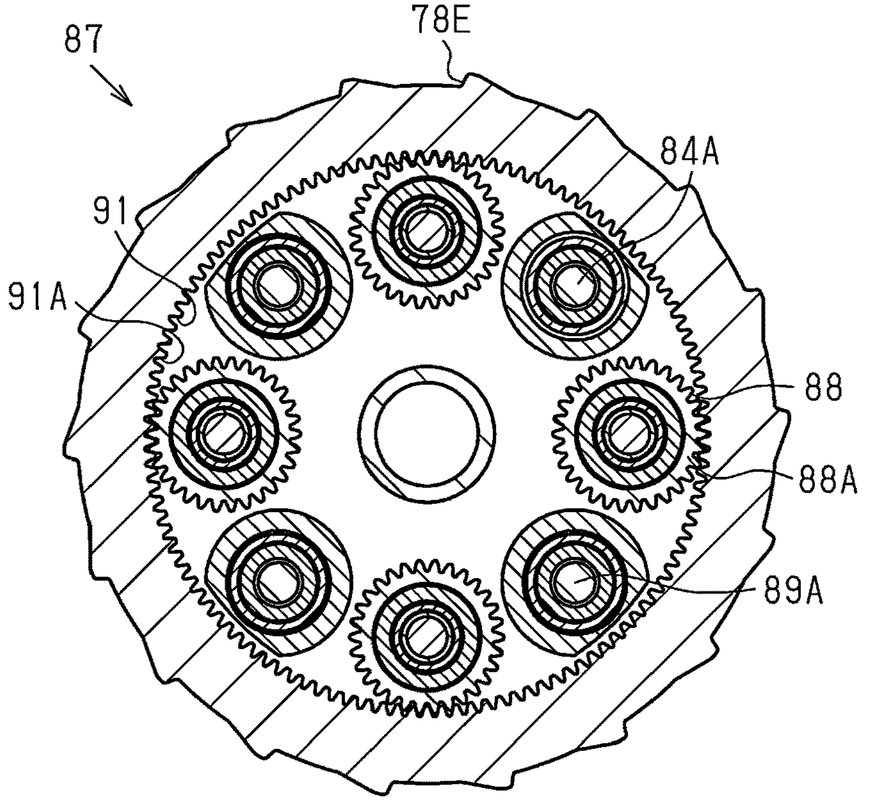
FIG. 16 is a cross-sectional view of the transmission device taken along section line D16-D16 in FIG. 6.
Figure 17:
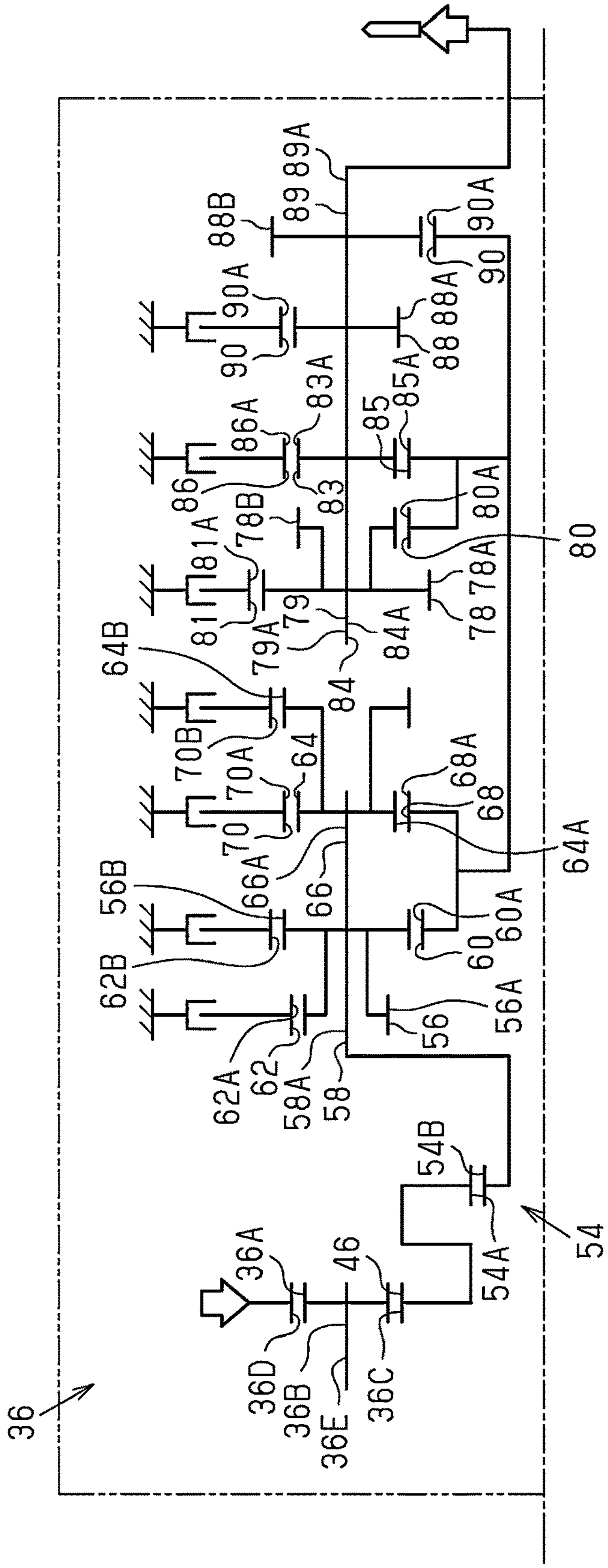
FIG. 17 is a skeleton diagram showing a transmission path of a driving force of the human-powered vehicle component shown in FIG. 6.
Figure 18:
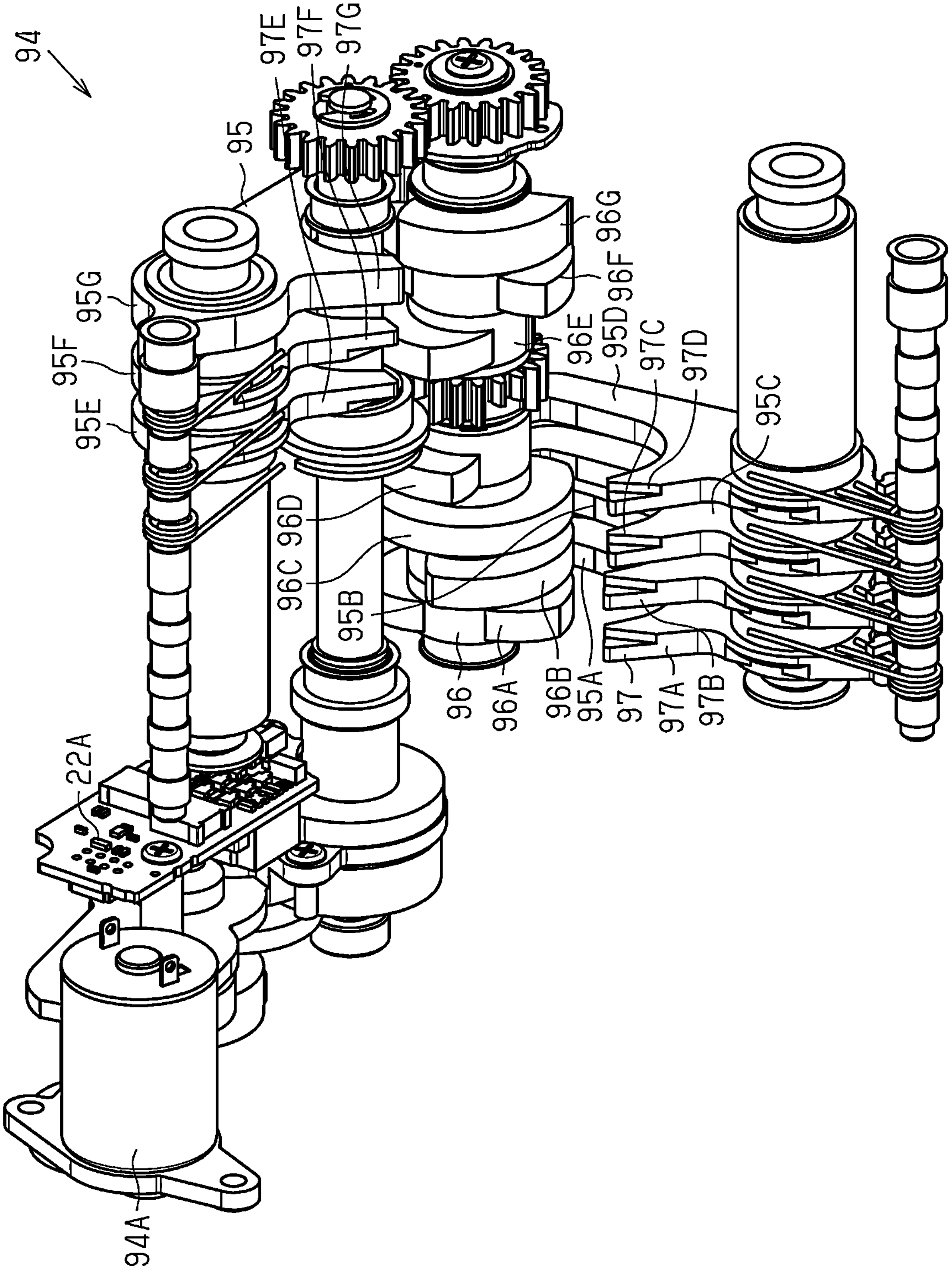
FIG. 18 is a perspective view of a transmission switching mechanism of the human-powered vehicle transmission device shown in FIG. 6.

The third carrier pin 79A and the at least one fifth carrier pin 89A are, for example, arranged overlapping a second plane that extends perpendicular to the shaft member 24. The at least one fourth carrier pin 84A and the at least one fifth carrier pin 89A are, for example, arranged overlapping the second plane that extends perpendicular to the shaft member 24. The second plane, for example, extends perpendicular to the shaft member 24 and includes the at least one fourth carrier pin 84A and the at least one fifth carrier pin 89A. For example, the entirety of a plane that extends perpendicular to the shaft member 24 and includes the at least one fourth carrier pin 84A and the at least one fifth carrier pin 89A corresponds to the second plane. FIG. 16 shows a cross-sectional view of the transmission device 22 in an example of the second plane.

The transmission sun gears 48C include, for example, at least one third sun gear 80, the at least one fourth sun gear 85, and the at least one fifth sun gear 90. The rotational center axis of the at least one third sun gear 80, the rotational center axis of the at least one fourth sun gear 85, and the rotational center axis of the at least one fifth sun gear 90 are, for example, substantially equal to the rotational center axis C2 of the shaft member 24.

The at least one third sun gear 80 is, for example, meshed with the at least one third planetary gear 78. The at least one third sun gear 80 includes, for example, a third transmission sun gear 80A. The third transmission sun gear 80A is, for example, meshed with the sixth transmission planetary gear 78B.

The at least one fourth sun gear 85 is, for example, meshed with the at least one fourth planetary gear 83. The at least one fourth sun gear 85 includes, for example, a fourth transmission sun gear 85A. The fourth transmission sun gear 85A is, for example, meshed with the seventh transmission planetary gear 83A.

The at least one fifth sun gear 90 is, for example, meshed with the at least one fifth planetary gear 88. The at least one fifth sun gear 90 includes, for example, a fifth transmission sun gear 90A. The at least one fifth sun gear 90 is, for example, meshed with the ninth transmission planetary gear 88B.

The at least one third sun gear 80 and the at least one fourth sun gear 85 are, for example, molded integrally. The third transmission sun gear 80A and the fourth transmission sun gear 85A are, for example, molded integrally. The at least one first sun gear 60 and the at least one second sun gear 68 can be formed separately and configured to rotate integrally. The third transmission sun gear 80A and the fourth transmission sun gear 85A can be formed separately and configured to rotate integrally with each other.

The at least one third sun gear 80 and the at least one fourth sun gear 85 are, for example, formed separately from the shaft member 24 and configured to rotate integrally with the shaft member 24. The third transmission sun gear 80A and the fourth transmission sun gear 85A are, for example, formed on an outer circumference of a second tubular member. For example, a second engagement portion 71B is formed on an inner circumference of the second tubular member. The second engagement portion 71B includes, for example, splines or serrations. The second engagement portion 71B engages, for example, a second shaft member engagement 24B of the shaft member 24. The second shaft member engagement 24B includes, for example, splines or serrations. The second shaft member engagement 24B is, for example, molded integrally with the shaft member 24. The at least one third sun gear 80 and the at least one fourth sun gear 85 can be, for example, molded integrally with the shaft member 24.

The at least one fifth sun gear 90 is, for example, molded integrally with the shaft member 24. The at least one fifth sun gear 90 can be formed separately from the shaft member 24, and configured to rotate integrally with the shaft member 24 using splines or serrations in the same manner as the at least one third sun gear 80 and the at least one fourth sun gear 85.

The at least one third sun gear 80 and the at least one fifth sun gear 90 are, for example, configured to rotate integrally in at least the first direction B1 about the rotational center axis C2 of the shaft member 24. The at least one fourth sun gear 85 and the at least one fifth sun gear 90 are, for example, configured to rotate integrally in at least the first direction B1 about the rotational center axis C2 of the shaft member 24. The at least one first sun gear 60, the at least one second sun gear 68, the at least one fourth sun gear 85, and the at least one fifth sun gear 90 are, for example, configured to rotate integrally in at least the first direction B1 about the rotational center axis C2 of the shaft member 24.

The at least one first sun gear 60, the at least one second sun gear 68, the at least one third sun gear 80, the at least one fourth sun gear 85, and the at least one fifth sun gear 90 are, for example, configured to rotate integrally in at least the first direction B1 about the rotational center axis C2 of the shaft member 24. In addition, the at least one first sun gear 60, the at least one second sun gear 68, the at least one third sun gear 80, the at least one fourth sun gear 85, and the at least one fifth sun gear 90 can be configured to rotate integrally in the second direction B2, opposite to the first direction B1, about the rotational center axis C2 of the shaft member 24.

The first transmission sun gear 60A has, for example, a larger pitch circle diameter than the fifth transmission sun gear 90A. The first transmission sun gear 60A has, for example, a smaller pitch circle diameter than each of the second transmission sun gear 68A, the third transmission sun gear 80A, and the fourth transmission sun gear 85A. The second transmission sun gear 68A has, for example, a larger pitch circle diameter than each of the first transmission sun gear 60A and the fifth transmission sun gear 90A. The second transmission sun gear 68A has, for example, a smaller pitch circle diameter than each of the third transmission sun gear 80A and the fourth transmission sun gear 85A.

The third transmission sun gear 80A has, for example, a larger pitch circle diameter than each of the first transmission sun gear 60A, the second transmission sun gear 68A, the fourth transmission sun gear 85A, and the fifth transmission sun gear 90A. The fourth transmission sun gear 85A has, for example, a larger pitch circle diameter than each of the first transmission sun gear 60A, the second transmission sun gear 68A, and the fifth transmission sun gear 90A. The fourth transmission sun gear 85A has, for example, a smaller pitch circle diameter than the third transmission sun gear 80A. The fifth transmission sun gear 90A has, for example, a smaller pitch circle diameter than each of the first transmission sun gear 60A, the second transmission sun gear 68A, the third transmission sun gear 80A, and the fourth transmission sun gear 85A.

The transmission ring gears 48D include, for example, at least one third ring gear 81. The at least one third ring gear 81 is, for example, meshed with the at least one third planetary gear 78. The at least one third ring gear 81 includes, for example, a fifth transmission ring gear 81A. The fifth transmission ring gear 81A is, for example, meshed with the fifth transmission planetary gear 78A.

The transmission ring gears 48D include, for example, the at least one fourth ring gear 86. The at least one fourth ring gear 86 is, for example, meshed with the at least one fourth planetary gear 83. The at least one fourth ring gear 86 includes, for example, a sixth transmission ring gear 86A. The sixth transmission ring gear 86A is, for example, meshed with the seventh transmission planetary gear 83A.

The transmission ring gears 48D include, for example, the at least one fifth ring gear 91. The at least one fifth ring gear 91 is, for example, meshed with the at least one fifth planetary gear 88. The at least one fifth ring gear 91 includes, for example, a seventh transmission ring gear 91A. The seventh transmission ring gear 91A is, for example, meshed with the eighth transmission planetary gear 88A.

In the transmission device 22, for example, a rotational state of at least one of the at least one first sun gear 60, the at least one second sun gear 68, the at least one first ring gear 62, and the at least one second ring gear 70 is controlled to switch the transmission stage in steps. In the transmission device 22, for example, a rotational state of at least one of the at least one third sun gear 80 and the at least one third ring gear 81 is controlled to switch the transmission stage in steps. In the transmission device 22, for example, a rotational state of at least one of the at least one fourth sun gear 85, the at least one fifth sun gear 90, the at least one fourth ring gear 86, and the at least one fifth ring gear 91 is controlled to switch the transmission stage in steps.

In the transmission device 22, for example, a rotational state of at least one of the at least one first ring gear 62, the at least one second ring gear 70, the at least one third ring gear 81, the at least one fourth ring gear 86, and the at least one fifth ring gear 91 is controlled to switch the transmission stage in steps. In the transmission device 22, a rotational state of at least one of the at least one first sun gear 60, the at least one second sun gear 68, the at least one third sun gear 80, the at least one fourth sun gear 85, and the at least one fifth sun gear 90 is controlled to switch the transmission stage in steps.

The transmission device 22 includes, for example, a plurality of transmission paths. The transmission paths correspond to the transmission stages, respectively. For example, the transmission stage is switched by changing one transmission path to another transmission path. The transmission paths form part of the transmission path of the human driving force. The driving force that is input to the input rotational portion 54 from the speed-increasing output portion 46 is transmitted through one of the transmission paths, and is output from the output rotational portion 32. The transmission paths include a first transmission path, a second transmission path, a third transmission path, a fourth transmission path, a fifth transmission path, a sixth transmission path, a seventh transmission path, an eighth transmission path, a ninth transmission path, a tenth transmission path, an eleventh transmission path, and a twelfth transmission path.

In the first transmission path, for example, the driving force that is input to the input rotational portion 54 is transmitted through the second carrier 66, the fourth transmission planetary gear 64B, the second transmission sun gear 68A, the shaft member 24, the fifth transmission sun gear 90A, the ninth transmission planetary gear 88B, and the fifth carrier portion 93, and is output to the output rotational portion 32.

In the second transmission path, for example, the driving force that is input to the input rotational portion 54 is transmitted through the second carrier 66, the third transmission planetary gear 64A, the second transmission sun gear 68A, the shaft member 24, the fifth transmission sun gear 90A, the ninth transmission planetary gear 88B, and the fifth carrier portion 93, and is output to the output rotational portion 32.

In the third transmission path, for example, the driving force that is input to the input rotational portion 54 is transmitted through the first carrier 58, the second transmission planetary gear 56B, the first transmission sun gear 60A, the shaft member 24, the fifth transmission sun gear 90A, the ninth transmission planetary gear 88B, and the fifth carrier portion 93, and is output to the output rotational portion 32.

In the fourth transmission path, for example, the driving force that is input to the input rotational portion 54 is transmitted through the first carrier 58, the first transmission planetary gear 56A, the second transmission planetary gear 56B, the first transmission sun gear 60A, the shaft member 24, the fifth transmission sun gear 90A, the ninth transmission planetary gear 88B, and the fifth carrier portion 93, and is output to the output rotational portion 32.

In the fifth transmission path, for example, the driving force that is input to the input rotational portion 54 is transmitted through the second carrier 66, the fourth transmission planetary gear 64B, the second transmission sun gear 68A, the shaft member 24, the fourth transmission sun gear 85A, the seventh transmission planetary gear 83A, the fourth carrier 84, and the fifth carrier portion 93, and is output to the output rotational portion 32.

In the sixth transmission path, for example, the driving force that is input to the input rotational portion 54 is transmitted through the second carrier 66, the third transmission planetary gear 64A, the second transmission sun gear 68A, the shaft member 24, the fourth transmission sun gear 85A, the seventh transmission planetary gear 83A, the fourth carrier 84, and the fifth carrier portion 93, and is output to the output rotational portion 32.

In the seventh transmission path, for example, the driving force that is input to the input rotational portion 54 is transmitted through the first carrier 58, the second transmission planetary gear 56B, the first transmission sun gear 60A, the shaft member 24, the fourth transmission sun gear 85A, the seventh transmission planetary gear 83A, the fourth carrier 84, and the fifth carrier portion 93, and is output to the output rotational portion 32.

In the eighth transmission path, for example, the driving force that is input to the input rotational portion 54 is transmitted through the first carrier 58, the first transmission planetary gear 56A, the second transmission planetary gear 56B, the first transmission sun gear 60A, the shaft member 24, the fourth transmission sun gear 85A, the seventh transmission planetary gear 83A, the fourth carrier 84, and the fifth carrier portion 93, and is output to the output rotational portion 32.

In the ninth transmission path, for example, the driving force that is input to the input rotational portion 54 is transmitted through the second carrier 66, the fourth transmission planetary gear 64B, the second transmission sun gear 68A, the shaft member 24, the third transmission sun gear 80A, the sixth transmission planetary gear 78B, the fourth carrier 84, and the fifth carrier portion 93, and is output to the output rotational portion 32.

In the tenth transmission path, for example, the driving force that is input to the input rotational portion 54 is transmitted through the second carrier 66, the third transmission planetary gear 64A, the second transmission sun gear 68A, the shaft member 24, the third transmission sun gear 80A, the sixth transmission planetary gear 78B, the fourth carrier 84, and the fifth carrier portion 93, and is output to the output rotational portion 32.

In the eleventh transmission path, for example, the driving force that is input to the input rotational portion 54 is transmitted through the first carrier 58, the second transmission planetary gear 56B, the first transmission sun gear 60A, the shaft member 24, the third transmission sun gear 80A, the sixth transmission planetary gear 78B, the fourth carrier 84, and the fifth carrier portion 93, and is output to the output rotational portion 32.

In the twelfth transmission path, for example, the driving force that is input to the input rotational portion 54 is transmitted through the first carrier 58, the first transmission planetary gear 56A, the second transmission planetary gear 56B, the first transmission sun gear 60A, the shaft member 24, the third transmission sun gear 80A, the sixth transmission planetary gear 78B, the fourth carrier 84, and the fifth carrier portion 93, and is output to the output rotational portion 32.

The first to twelfth transmission paths are selected, for example, in accordance with the rotational state of the transmission ring gears 48D. The rotational state of the transmission ring gears 48D is, for example, switched between a permission state and a restriction state. In the restriction state, the rotation of the transmission ring gears 48D relative to the housing 30 is restricted. In the permission state, the rotation of the transmission ring gears 48D relative to the housing 30 is permitted. In the restriction state, as long as the rotation in one of the first direction B1 and the second direction B2 about the rotational center axis C2 is restricted to hamper rotation of the transmission ring gears 48D so that the transmission device 22 transmits the human driving force, the rotation in the other of the first direction B1 and the second direction B2 does not have to be restricted.

Table 1 shows the rotational states of the first to seventh transmission ring gears 62A, 62B, 70A, 70B, 81A, 86A, and 91A in each of the transmission stages. In an example, as the transmission stage number increases, the transmission ratio increases. In Table 1, in a case where the first to seventh transmission ring gears 62A, 62B, 70A, 70B, 81A, 86A, and 91A are in the restriction state, the rotational state is indicated by "o." In Table 1, in a case where the first to seventh transmission ring gears 62A, 62B, 70A, 70B, 81A, 86A, and 91A are in the permission state, the rotational state is indicated by "x."

TABLE 1

| Transmission Stage | 1st Transmission Ring Gear | 2nd Transmission Ring Gear | 3rd Transmission Ring Gear | 4th Transmission Ring Gear | 5th Transmission Ring Gear | 6th Transmission Ring Gear | 7th Transmission Ring Gear |
|---|---|---|---|---|---|---|---|
| 1 | X | X | X | ○ | X | X | ○ |
| 2 | X | X | ○ | X | X | X | ○ |
| 3 | X | ○ | X | X | X | X | ○ |
| 4 | ○ | X | X | X | X | X | ○ |

TABLE 1-continued

| Transmission Stage | 1st Transmission Ring Gear | 2nd Transmission Ring Gear | 3rd Transmission Ring Gear | 4th Transmission Ring Gear | 5th Transmission Ring Gear | 6th Transmission Ring Gear | 7th Transmission Ring Gear |
|---|---|---|---|---|---|---|---|
| 5 | X | X | X | ○ | X | ○ | X |
| 6 | X | X | ○ | X | X | ○ | X |
| 7 | X | ○ | X | X | X | ○ | X |
| 8 | ○ | X | X | X | X | ○ | X |
| 9 | X | X | X | ○ | ○ | X | X |
| 10 | X | X | ○ | X | ○ | X | X |
| 11 | X | ○ | X | X | ○ | X | X |
| 12 | ○ | X | X | X | ○ | X | X |

For example, in a case where the first to third transmission ring gears 62A, 62B, 70A, the fifth transmission ring gear 81A, and the sixth transmission ring gear 86A are in the permission state, and the fourth transmission ring gear 70B and the seventh transmission ring gear 91A are in the restriction state, the first transmission path is selected from the transmission paths.

For example, in a case where the first transmission ring gear 62A, the second transmission ring gear 62B, and the fourth to sixth transmission ring gears 70B, 81A, and 86A are in the permission state, and the third transmission ring gear 70A and the seventh transmission ring gear 91A are in the restriction state, the second transmission path is selected from the transmission paths.

For example, in a case where the first transmission ring gear 62A and the third to sixth transmission ring gears 70A, 70B, 81A, and 86A are in the permission state, and the second transmission ring gear 62B and the seventh transmission ring gear 91A are in the restriction state, the third transmission path is selected from the transmission paths.

For example, in a case where the second to sixth transmission ring gears 62B, 70A, 70B, 81A, and 86A are in the permission state, and the first transmission ring gear 62A and the seventh transmission ring gear 91A are in the restriction state, the fourth transmission path is selected from the transmission paths.

For example, in a case where the first to third transmission ring gears 62A, 62B, and 70A, the fifth transmission ring gear 81A, and the seventh transmission ring gear 91A are in the permission state, and the fourth transmission ring gear 70B and the sixth transmission ring gear 86A are in the restriction state, the fifth transmission path is selected from the transmission paths.

For example, in a case where the first transmission ring gear 62A, the second transmission ring gear 62B, the fourth transmission ring gear 70B, the fifth transmission ring gear 81A, and the seventh transmission ring gear 91A are in the permission state, and the third transmission ring gear 70A and the sixth transmission ring gear 86A are in the restriction state, the sixth transmission path is selected from the transmission paths.

For example, in a case where the first transmission ring gear 62A, the third to fifth transmission ring gears 70A, 70B, and 81A, and the seventh transmission ring gear 91A are in the permission state, and the second transmission ring gear 62B and the sixth transmission ring gear 86A are in the restriction state, the seventh transmission path is selected from the transmission paths.

For example, in a case where the second to fifth transmission ring gears 62B, 70A, 70B, and 81A and the seventh transmission ring gear 91A are in the permission state, and the first transmission ring gear 62A and the sixth transmission ring gear 86A are in the restriction state, the eighth transmission path is selected from the transmission paths.

For example, in a case where the first to third transmission ring gears 62A, 62B, and 70A, the sixth transmission ring gear 86A, and the seventh transmission ring gear 91A are in the permission state, and the fourth transmission ring gear 70B and the fifth transmission ring gear 81A are in the restriction state, the ninth transmission path is selected from the transmission paths.

For example, in a case where the first transmission ring gear 62A, the second transmission ring gear 62B, the fourth transmission ring gear 70B, the sixth transmission ring gear 86A, and the seventh transmission ring gear 91A are in the permission state, and the third transmission ring gear 70A and the fifth transmission ring gear 81A are in the restriction state, the tenth transmission path is selected from the transmission paths.

For example, in a case where the first transmission ring gear 62A, the third transmission ring gear 70A, the fourth transmission ring gear 70B, the sixth transmission ring gear 86A, and the seventh transmission ring gear 91A are in the permission state, and the second transmission ring gear 62B and the fifth transmission ring gear 81A are in the restriction state, the eleventh transmission path is selected from the transmission paths.

For example, the second to fourth transmission ring gears 62B, 70A, and 70B, the sixth transmission ring gear 86A, and the seventh transmission ring gear 91A are in the permission state, and the first transmission ring gear 62A and the fifth transmission ring gear 81A are in the restriction state, the twelfth transmission path is selected from the transmission paths.

The transmission device 22 further includes, for example, a transmission switching mechanism 94. The transmission device 22 is, for example, configured to change the rotational state of the transmission ring gears 48D to switch the transmission stages of the transmission device 22 in steps.

The transmission switching mechanism 94, for example, switches the rotational state of the first ring gears 62 to switch the transmission stage in steps. The transmission switching mechanism 94, for example, switches the rotational state of the second ring gears 70 to switch the transmission stage in steps. The transmission switching mechanism 94, for example, switches the rotational state of the at least one first ring gear 62 and the rotational state of the at least one second ring gear 70 to switch the transmission stage in steps.

The transmission switching mechanism 94, for example, is configured to switch the rotational state of the at least one third ring gear 81 to switch the transmission stage in steps. The transmission switching mechanism 94, for example, is configured to switch the rotational state of the at least one fourth ring gear 86 to switch the transmission stage in steps.

The transmission switching mechanism 94, for example, is configured to switch the rotational state of the at least one fifth ring gear 91 to switch the transmission stage in steps. The transmission switching mechanism 94, for example, is configured to switch the rotational states of the at least one first ring gear 62, the at least one second ring gear 70, the at least one third ring gear 81, the at least one fourth ring gear 86, and the at least one fifth ring gear 91 to switch the transmission stage in steps.

The transmission switching mechanism 94 includes, for example, a plurality of clutches 95. The clutches 95, for example, switch the rotational states of the transmission ring gears 48D between the permission state and the restriction state. Each of the clutched 95 includes, for example, a rotational member 96 and an engaging member 97 configured to engage at least one recess 78E provided on an outer circumference of the transmission ring gears 48D. The clutch 95 is, for example, configured to switch, as the rotational member 96 rotates, between a first state in which the engaging member 97 is separated from the at least one recess 78E and a second state in which the engaging member 97 engages the at least one recess 78E. The engaging member 97 includes, for example, a pawl. Preferably, the at least one recess 78E includes a plurality of recesses 78E. The recesses 78E are, for example, arranged on the outer circumference of the transmission ring gears 48D at intervals about the rotational center axis C2 of the shaft member 24.

The clutches 95 include, for example, a first clutch 95A corresponding to the first transmission ring gear 62A. The first clutch 95A includes, for example, a first rotational member 96A and a first engaging member 97A. The first engaging member 97A is, for example, configured to engage at least one recess 78E of the first transmission ring gear 62A. The first clutch 95A is, for example, configured to switch, as the first rotational member 96A rotates, between a first state in which the first engaging member 97A is separated from the at least one recess 78E and a second state in which the first engaging member 97A engages the at least one recess 78E.

The clutches 95 include, for example, a second clutch 95B corresponding to the second transmission ring gear 62B. The second clutch 95B includes, for example, a second rotational member 96B and a second engaging member 97B. The second engaging member 97B is, for example, configured to engage the at least one recess 78E of the second transmission ring gear 62B. The second clutch 95B is, for example, configured to switch, as the second rotational member 96B rotates, between a first state in which the second engaging member 97B is separated from the at least one recess 78E and a second state in which the second engaging member 97B engages the at least one recess 78E.

The clutches 95 include, for example, a third clutch 95C corresponding to the third transmission ring gear 70A. The third clutch 95C includes, for example, a third rotational member 96C and a third engaging member 97C. The third engaging member 97C is, for example, configured to engage at least one recess 78E of the third transmission ring gear 70A. The third clutch 95C is, for example, configured to switch, as the third rotational member 96C rotates, between a first state in which the third engaging member 97C is separated from the at least one recess 78E and a second state in which the third engaging member 97C engages the at least one recess 78E.

The clutches 95 include, for example, a fourth clutch 95D corresponding to the fourth transmission ring gear 70B. The fourth clutch 95D includes, for example, a fourth rotational member 96D and a fourth engaging member 97D. The fourth engaging member 97D is, for example, configured to engage at least one recess 78E of the fourth transmission ring gear 70B. The fourth clutch 95D is, for example, configured to switch, as the fourth rotational member 96D rotates, between a first state in which the fourth engaging member 97D is separated from the at least one recess 78E and a second state in which the fourth engaging member 97D engages the at least one recess 78E.

The clutches 95 include, for example, a fifth clutch 95E corresponding to the fifth transmission ring gear 81A. The fifth clutch 95E includes, for example, a fifth rotational member 96E and a fifth engaging member 97E. The fifth engaging member 97E is, for example, configured to engage at least one recess 78E of the fifth transmission ring gear 81A. The fifth clutch 95E is, for example, configured to switch, as the fifth rotational member 96E rotates, between a first state in which the fifth engaging member 97E is separated from the at least one recess 78E and a second state in which the fifth engaging member 97E engages the at least one recess 78E.

The clutches 95 include, for example, a sixth clutch 95F corresponding to the sixth transmission ring gear 86A. The sixth clutch 95F includes, for example, a sixth rotational member 96F and a sixth engaging member 97F. The sixth engaging member 97F is, for example, configured to engage at least one recess 78E of the sixth transmission ring gear 86A. The sixth clutch 95F is, for example, configured to switch, as the sixth rotational member 96F rotates, between a first state in which the sixth engaging member 97F is separated from the at least one recess 78E and a second state in which the sixth engaging member 97F engages the at least one recess 78E.

The clutches 95 include, for example, a seventh clutch 95G corresponding to the seventh transmission ring gear 91A. The seventh clutch 95G includes, for example, a seventh rotational member 96G and a seventh engaging member 97G. The seventh engaging member 97G is, for example, configured to engage at least one recess 78E of the seventh transmission ring gear 91A. The seventh clutch 95G is, for example, configured to switch, as the seventh rotational member 96G rotates, between a first state in which the seventh engaging member 97G is separated from the at least one recess 78E and a second state in which the seventh engaging member 97G engages the at least one recess 78E.

The transmission switching mechanism 94 includes, for example, an electric actuator. The electric actuator includes, for example, a transmission motor 94A. The electric actuator is, for example, configured to switch the states of the clutches 95 between the first state and the second state. The rotational member 96 is, for example, configured to be rotated by the electric actuator.

The transmission device 22 includes, for example, a first controller 22A. The first controller 22A is, for example, configured to control the transmission motor 94A. Thus, the first controller 22A can also be referred to as a transmission controller. In an example, the first controller 22A includes a processor that executes a predetermined control program. The processor includes, for example, a central processing unit (CPU) or a micro processing unit (MPU). Thus, the first controller 22A is formed of one or more semiconductor chips that are mounted on a circuit board. The processor can be provided at separate positions. The first controller 22A can include one or more microcomputers. The term "controller" as used herein refers to hardware that executes a software program, and does not include a human being. Accordingly, the first controller 22A can also be referred to as a first electronic controller, an electronic transmission controller, or merely as an electronic controller.

The transmission device 22 includes, for example, first storage. The first storage stores various control programs and information used for various control processes. The first storage includes, for example, nonvolatile memory and volatile memory. A non-volatile memory includes, for example, at least one of a read-only memory (ROM), an erasable programmable read-only memory (EPROM), an electrically erasable programmable read-only memory (EEPROM), and a flash memory. The volatile memory includes, for example, a random-access memory (RAM). Thus, the first storage can be any computer storage device or any non-transitory computer-readable medium with the sole exception of a transitory, propagating signal.

The first controller 22A is, for example, configured to receive a transmission signal from a transmission operating device and control the transmission motor 94A. The first controller 22A can be connected to the transmission operating device by a wireless communication device or an electrical cable. Instead of receiving a transmission signal from the transmission operating device, the first controller 22A can receive a signal from a sensor mounted on the human-powered vehicle and control the transmission motor 94A so that an automatic transmission is performed.

For example, in a case where the first transmission path is selected from the transmission paths, the transmission controller 22A controls the transmission motor 94A so that the first to third clutches 95A, 95B, and 95C, the fifth clutch 95E, and the sixth clutch 95F are in the first state. For example, in a case where the first transmission path is selected from the transmission paths, the transmission controller 22A controls the transmission motor 94A so that the fourth clutch 95D and the seventh clutch 95G are in the second state.

For example, in a case where the second transmission path is selected from the transmission paths, the transmission controller 22A controls the transmission motor 94A so that the first clutch 95A, the second clutch 95B, and the fourth to sixth clutches 95D, 95E, and 95F are in the first state. For example, in a case where the second transmission path is selected from the transmission paths, the transmission controller 22A controls the transmission motor 94A so that the third clutch 95C and the seventh clutch 95G are in the second state.

For example, in a case where the third transmission path is selected from the transmission paths, the transmission controller 22A controls the transmission motor 94A so that the first clutch 95A and the third to sixth clutches 95C, 95D, 95E, and 95F are in the first state. For example, in a case where the third transmission path is selected from the transmission paths, the transmission controller 22A controls the transmission motor 94A so that the second clutch 95B and the seventh clutch 95G are in the second state.

For example, in a case where the fourth transmission path is selected from the transmission paths, the transmission controller 22A controls the transmission motor 94A so that the second to sixth clutches 95B, 95C, 95D, 95E, and 95F are in the first state. For example, in a case where the fourth transmission path is selected from the transmission paths, the transmission controller 22A controls the transmission motor 94A so that the first clutch 95A and the seventh clutch 95G are in the second state.

For example, in a case where the fifth transmission path is selected from the transmission paths, the transmission controller 22A controls the transmission motor 94A so that the first to third clutches 95A, 95B, and 95C, the fifth clutch 95E, and the seventh clutch 95G are in the first state. For example, in a case where the fifth transmission path is selected from the transmission paths, the transmission controller 22A controls the transmission motor 94A so that the fourth clutch 95D and the sixth clutch 95F are in the second state.

For example, in a case where the sixth transmission path is selected from the transmission paths, the transmission controller 22A controls the transmission motor 94A so that the first clutch 95A, the second clutch 95B, the fourth clutch 95D, the fifth clutch 95E, and the seventh clutch 95G are in the first state. For example, in a case where the sixth transmission path is selected from the transmission paths, the transmission controller 22A controls the transmission motor 94A so that the third clutch 95C and the sixth clutch 95F are in the second state.

For example, in a case where the seventh transmission path is selected from the transmission paths, the transmission controller 22A controls the transmission motor 94A so that the first clutch 95A, the third clutch 95C, the fourth clutch 95D, the fifth clutch 95E, and the seventh clutch 95G are in the first state. For example, in a case where the seventh transmission path is selected from the transmission paths, the transmission controller 22A controls the transmission motor 94A so that the second clutch 95B and the sixth clutch 95F are in the second state.

For example, in a case where the eighth transmission path is selected from the transmission paths, the transmission controller 22A controls the transmission motor 94A so that the second to fifth clutches 95B, 95C, 95D, and 95E and the seventh clutch 95G are in the first state. For example, in a case where the eighth transmission path is selected from the transmission paths, the transmission controller 22A controls the transmission motor 94A so that the first clutch 95A and the sixth clutch 95F are in the second state.

For example, in a case where the ninth transmission path is selected from the transmission paths, the transmission controller 22A controls the transmission motor 94A so that the first to third clutches 95A, 95B, and 95C, the sixth clutch 95F, and the seventh clutch 95G are in the first state. For example, in a case where the ninth transmission path is selected from the transmission paths, the transmission controller 22A controls the transmission motor 94A so that the fourth clutch 95D and the fifth clutch 95E are in the second state.

For example, in a case where the tenth transmission path is selected from the transmission paths, the transmission controller 22A controls the transmission motor 94A so that the first clutch 95A, the second clutch 95B, the fourth clutch 95D, the sixth clutch 95F, and the seventh clutch 95G are in the first state. For example, in a case where the tenth transmission path is selected from the transmission paths, the transmission controller 22A controls the transmission motor 94A so that the third clutch 95C and the fifth clutch 95E are in the second state.

For example, in a case where the eleventh transmission path is selected from the transmission paths, the transmission controller 22A controls the transmission motor 94A so that the first clutch 95A, the third clutch 95C, the fourth clutch 95D, the sixth clutch 95F, and the seventh clutch 95G are in the first state. For example, in a case where the eleventh transmission path is selected from the transmission paths, the transmission controller 22A controls the transmission motor 94A so that the second clutch 95B and the fifth clutch 95E are in the second state.

For example, in a case where the twelfth transmission path is selected from the transmission paths, the transmission controller 22A controls the transmission motor 94A so that the second to fourth clutches 95B, 95C, and 95D, the sixth clutch 95F, and the seventh clutch 95G are in the first state. For example, in a case where the twelfth transmission path is selected from the transmission paths, the transmission controller 22A controls the transmission motor 94A so that the first clutch 95A and the fifth clutch 95E are in the second state.

Second Embodiment

Figure 19:
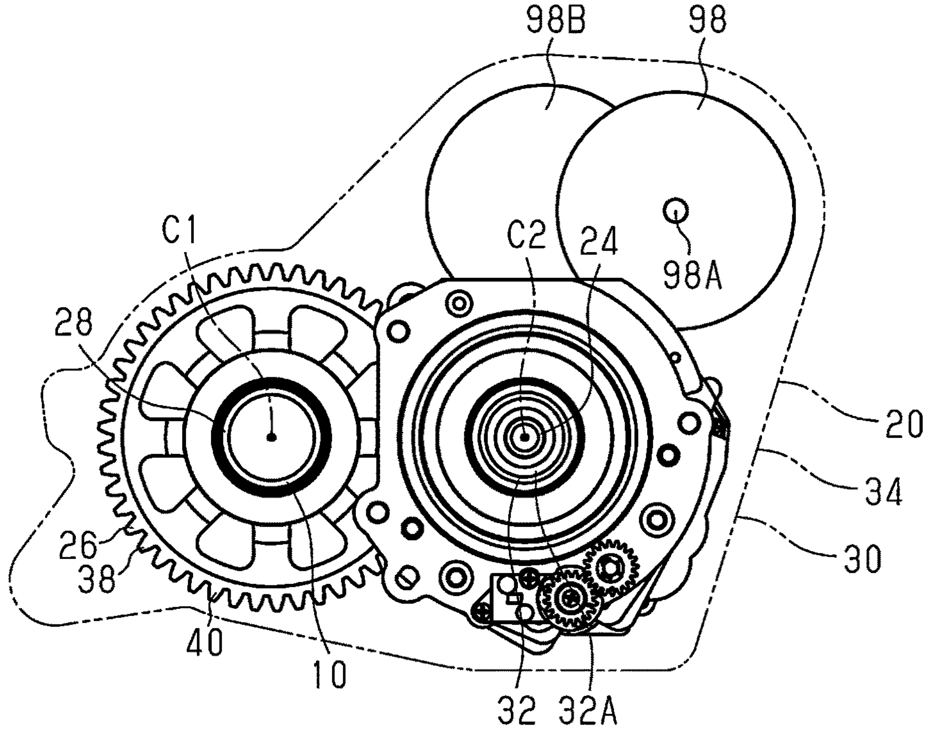
FIG. 19 is a side view showing a human-powered vehicle component without a housing in accordance with a second embodiment in the first direction.
Figure 20:
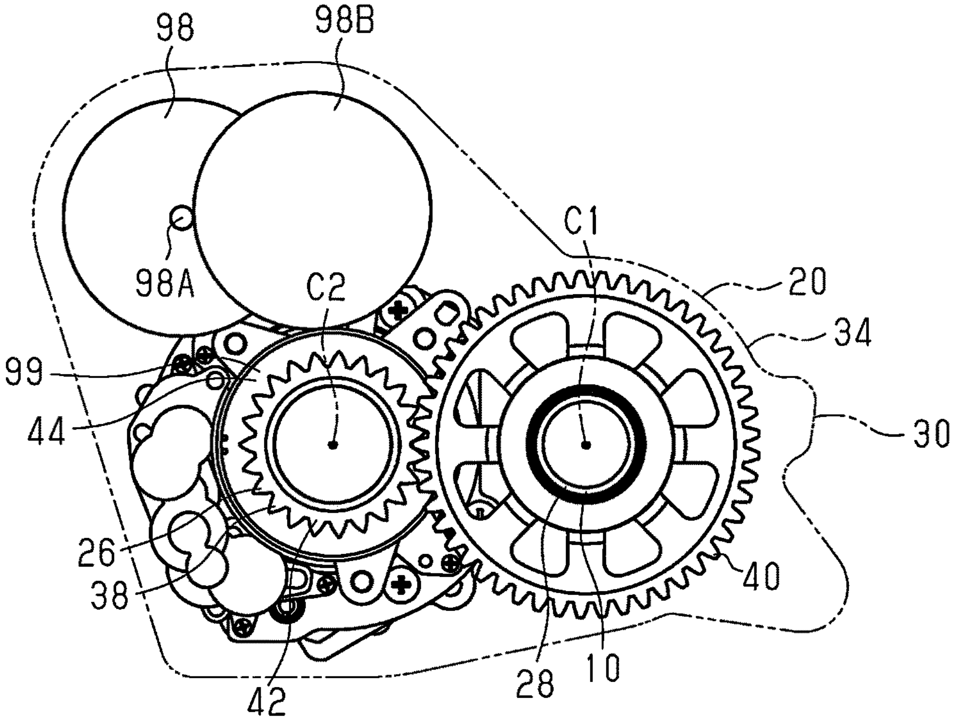
FIG. 20 is a side view showing the human-powered vehicle component without the housing in accordance with the second embodiment in the second direction.
Figure 21:
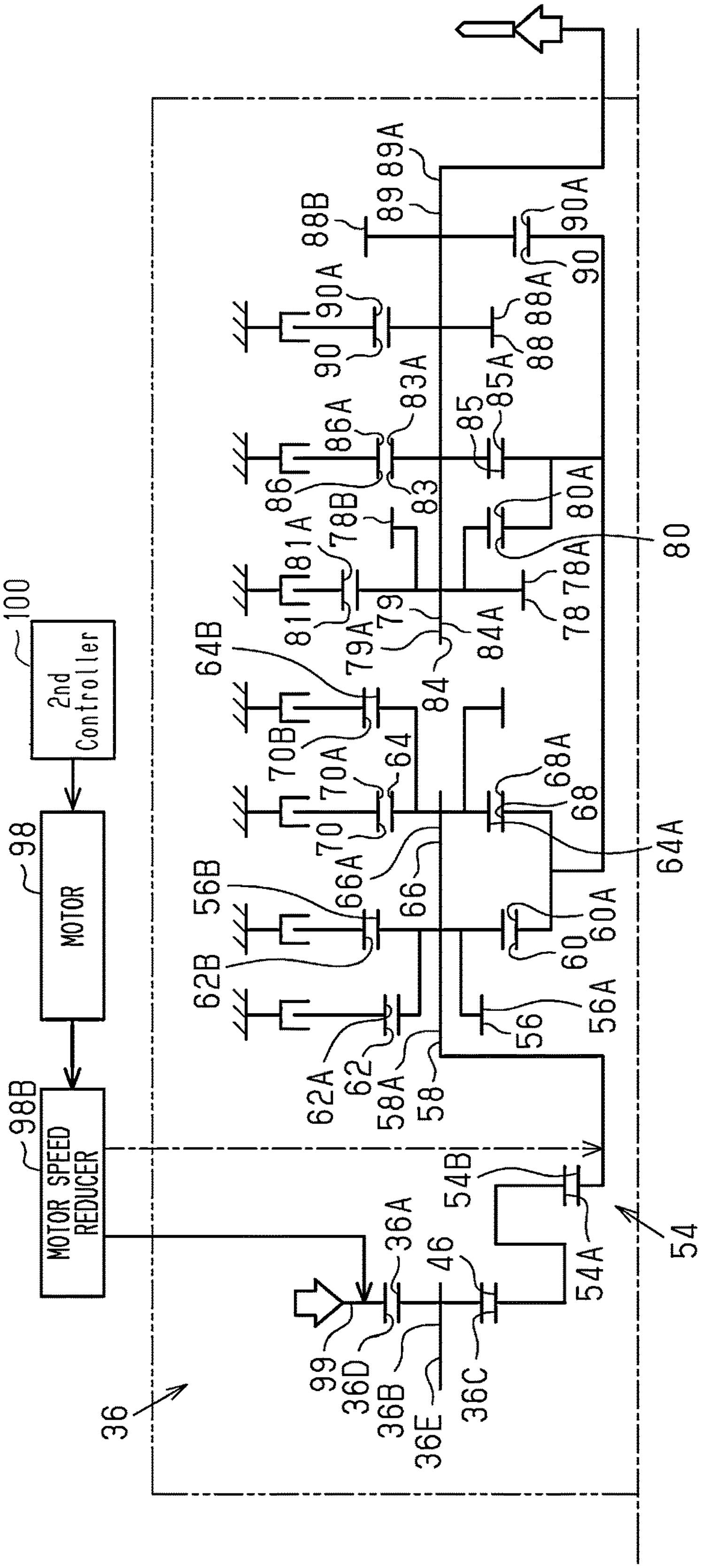
FIG. 21 is a skeleton diagram showing a transmission path of a driving force of a human-powered vehicle component in accordance with the second embodiment.

A second embodiment of the component 20 and the transmission device 22 will now be described with reference to FIGS. 19 to 21. In the second embodiment, same reference characters are given to those elements of the component 20 and the transmission device 22 that are the same as the corresponding elements of the component 20 and the transmission device 22 of the first embodiment. Such elements will not be described in detail.

In the second embodiment, the component 20 for a human-powered vehicle includes, for example, the transmission device 22 and a motor 98 configured to apply a propulsion force to the human-powered vehicle. In an example, the component 20 further includes the motor 98 configured to apply a propulsion force to the human-powered vehicle in addition to the transmission device 22, the shaft member 24, and the speed increaser 26. The motor 98 is, for example, an assist motor. The motor 98 includes, for example, a motor rotational axle 98A.

The component 20 further includes, for example, a resultant force portion 99. The resultant force portion 99, for example, combines the motor driving force of the motor 98 with the human driving force. The resultant force portion 99 includes, for example, at least one of the speed-increasing input portion 44 and the input rotational portion 54. The speed-increasing input portion 44 is, for example, configured to receive the rotational torque from the motor 98. The speed-increasing input portion 44, for example, combines the motor driving force of the motor 98 with the human driving force.

The component 20 further includes, for example, a motor speed reducer 98B. For example, a motor driving force of the motor 98 is input to the motor speed reducer 98B. The motor speed reducer 98B, for example, outputs the motor driving force of the motor 98 to the resultant force portion 99. The motor speed reducer 98B, for example, connects the motor rotational axle 98A and the resultant force portion 99. In a case where the rotational torque of the motor 98 is input to the speed-increasing input portion 44, the reduction ratio of the motor speed reducer 98B is decreased. This allows for reduction in size of the motor speed reducer 98B.

The motor speed reducer 98B includes, for example, at least one of a gear, a pulley, and an endless annular member. The endless annular member includes, for example, at least one of a chain and a belt. The motor speed reducer 98B includes, for example, a gear. The motor speed reducer 98B can include a planetary gear mechanism. The motor speed reducer 98B can include a pulley and a belt. The motor speed reducer 98B can include a gear and a chain.

The component 20 is, for example, a drive unit. The transmission device 22, the shaft member 24, the speed increaser 26, at least part of the input rotational shaft 28, at least part of the motor 98, and at least part of the motor speed reducer 98B are, for example, disposed in the inner cavity 20A of the housing 30.

The component 20 further includes, for example, a third one-way clutch. The third one-way clutch is, for example, provided in a transmission path of the motor driving force between the motor 98 and the resultant force portion 99. The third one-way clutch, for example, allows transmission of the rotational force of the motor 98 to the resultant force portion 99 and restricts transmission of the rotational force of the resultant force portion 99 caused by the human driving force to the motor 98. The third one-way clutch includes, for example, at least one of a roller clutch, a pawl-type clutch, and a sprag-type clutch.

The drive unit includes, for example, a second controller 100 configured to control the motor 98. The second controller 100 is, for example, accommodated in the housing 30. In an example, the second controller 100 includes a processor that executes a predetermined control program. The processor includes, for example, a CPU or an MPU. The processor can be provided at separate positions. The second controller 100 can include one or more microcomputers. The second controller 100 further includes, for example, an inverter circuit. The inverter circuit is electrically connected to the processor and the motor 98. The second controller 100 can include a processor shared with the first controller 22A. The second controller 100 can also be referred to as a motor controller, or an electronic motor controller, or a second electronic controller.

The drive unit can further include a torque sensor configured to output a signal in accordance with the human driving force input to the crank axle 10. The controller is, for example, configured to control the motor 98 in accordance with a detection result of a torque sensor. The torque sensor includes, for example, a strain gauge, a magnetostrictive sensor, or another known sensor. The torque sensor can be, for example, provided on the speed increaser 26, the crank axle 10, or the crank arms 12.

The drive unit includes, for example, second storage. The second storage stores various control programs and information used for various control processes. The storage includes, for example, a nonvolatile memory and a volatile memory. The nonvolatile memory includes, for example, at least one of a ROM, an EPROM, an EEPROM, and a flash memory. The volatile memory includes, for example, a RAM. The second storage can include a memory shared with the first storage. Thus, the second storage can be any computer storage device or any non-transitory computer-readable medium with the sole exception of a transitory, propagating signal.

Modifications

The description related to the above embodiments exemplifies, without any intention to limit, applicable forms of a component for a human-powered vehicle and a transmission device for a human-powered vehicle according to the present disclosure. The human-powered vehicle component and the human-powered vehicle transmission device according to the present disclosure can be applied to, for example, modifications of the embodiments that are described below and combinations of at least two of the modifications that do not contradict each other. In the following modifications, same reference characters are given to those components that are the same as the corresponding components of the above embodiments. Such components will not be described in detail.

At least one of the minimum transmission ratio and the maximum transmission ratio of the transmission device 22 can be changed. The minimum transmission ratio of the transmission device 22 can be greater than one. The maximum transmission ratio of the transmission device 22 can be less than or equal to one. The transmission ratio of the transmission device 22 can include one. The minimum transmission ratio of the transmission device 22 can be one, and the maximum transmission ratio of the transmission device 22 can be 2.6.

The number of transmission stages of the transmission device 22 can be changed. For example, in each embodiment, the first transmission unit can be omitted, and the second transmission unit can be omitted.

The component 20 can be provided on the axle of the wheel of the human-powered vehicle. In this modified example, the component 20 is, for example, provided on the axle of the driving wheel. The driving wheel includes, for example, the rear wheel. The shaft member 24 includes, for example, a hub axle. The input rotational shaft 28 is, for example, not provided on the housing 30. The output rotor 34 includes, for example, a hub shell. The output rotational portion 32 is, for example, formed integrally with the output rotor 34. The hub shell is, for example, formed integrally with the housing 30. The hub shell can be formed separately from the housing 30 and configured to rotate integrally with the housing 30. The component 20 is provided, for example, on the rear hub of the rear wheel.

The rotational torque of the motor 98 can be configured to be input to the input rotational portion 54. In a case where the rotational torque of the motor 98 is input to the input rotational portion 54, the reduction ratio of the motor speed reducer 98B is further decreased. This allows for further reduction in size of the motor speed reducer 98B.

The motor speed reducer 98B can be omitted. In a case where the motor speed reducer 98B is omitted, for example, the rotational torque of the motor 98 is input to the input rotational portion 54 or the input rotational portion 54.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

In this specification, ordinal numbers such as "first, second, and third" are used to merely distinguish between members having the same name and have no particular meaning.

What is claimed is:

1. A component for a human-powered vehicle, the component comprising:
- a transmission device including a plurality of transmission stages;
- a shaft member spaced from an input rotational shaft of the human-powered vehicle, the transmission device being arranged on the shaft member;
- a speed increaser configured to transmit a human driving force that is input to the input rotational shaft to the transmission device; and
- an output rotor configured to output a driving force that is output from the transmission device,
- the speed increaser including at least one first planetary gear group,
- the at least one first planetary gear group being rotatable about a rotational center axis of the shaft member, and
- the output rotor being arranged coaxially with the shaft member.

2. The component according to claim 1, wherein:
- the speed increaser further includes a speed-increasing unit that differs from the at least one first planetary gear group; and
- the speed-increasing unit is configured to transmit the human driving force that is input to the input rotational shaft to the at least one first planetary gear group.

3. The component according to claim 2, wherein the speed-increasing unit includes:

a first speed-increasing gear arranged coaxially with the input rotational shaft; and a second speed-increasing gear meshed with the first speed-increasing gear and arranged coaxially with the shaft member.

4. The component according to claim 1, wherein the component includes the input rotational shaft.

5. The component according to claim 4, wherein the shaft member is arranged substantially parallel to the input rotational shaft.

6. The component according to claim 4, further comprising:
- a housing accommodating the input rotational shaft, the speed increaser, and transmission device; and
- an output rotational portion to which a driving force output from the transmission device is transmitted,
- the output rotational portion being configured to transmit the driving force to a rear wheel through a linking member.

7. The component according to claim 1, wherein the at least one first planetary gear group, the transmission device, and the output rotor are arranged in an axial direction of the shaft member in an order of the at least one first planetary gear group, the transmission device, and the output rotor.

8. The component according to claim 1, wherein the speed increaser and the transmission device are configured to rotate the output rotor forward in a case where the input rotational shaft rotates forward.

9. The component according to claim 1, wherein the input rotational shaft includes a crank axle.

10. A component for a human-powered vehicle, the component comprising:
- a transmission device including a plurality of transmission stages;
- a shaft member spaced from an input rotational shaft of the human-powered vehicle, the transmission device being arranged on the shaft member; and
- a speed increaser configured to transmit a human driving force that is input to the input rotational shaft to the transmission device,
- the speed increaser including at least one first planetary gear group, and
- the transmission device including at least one second planetary gear group.

11. The component according to claim 10, wherein the at least one first planetary gear group is rotatable about a rotational center axis of the shaft member.

12. The component according to claim 10, wherein:
- the at least one second planetary gear group includes a plurality of transmission ring gears; and
- the transmission device is configured to change a rotational state of the transmission ring gears to switch the transmission stages of the transmission device in steps.

13. A component for a human-powered vehicle, the component comprising:
- a transmission device including a plurality of transmission stages;

a shaft member spaced from an input rotational shaft of the human-powered vehicle, the transmission device being arranged on the shaft member;

a speed increaser configured to transmit a human driving force that is input to the input rotational shaft to the transmission device;

the speed increaser including at least one first planetary gear group, the at least one first planetary gear group being rotatable about a rotational center axis of the shaft member, the speed increaser further including a speed-increasing unit that differs from the at least one first planetary gear group, the speed-increasing unit being configured to transmit the human driving force that is input to the input rotational shaft to the at least one first planetary gear group, the speed-increasing unit including:

a first speed-increasing gear arranged coaxially with the input rotational shaft; and a second speed-increasing gear meshed with the first speed-increasing gear and arranged coaxially with the shaft member, and the at least one first planetary gear group including a speed-increasing input portion and a speed-increasing output portion, the speed-increasing input portion and the speed-increasing output portion being configured to rotate in opposite directions.

14. The component according to claim 13, wherein the speed-increasing input portion is formed integrally with the second speed-increasing gear.

15. The component according to claim 13, wherein:

the speed-increasing input portion includes a speed-increasing ring gear; and the speed-increasing output portion includes a speed-increasing sun gear.

16. The component according to claim 13, wherein the at least one first planetary gear group is located between the second speed-increasing gear and the transmission device in an axial direction of the shaft member.

17. The component according to claim 13, further comprising:

a motor configured to apply a propulsion force to the human-powered vehicle, the speed-increasing input portion being configured to receive rotational torque of the motor.

* * * * *